US012569868B2

(12) United States Patent
Hong et al.

(10) Patent No.: US 12,569,868 B2
(45) Date of Patent: Mar. 10, 2026

(54) PUMP DISPENSER

(71) Applicant: The Procter & Gamble Company, Cincinnati, OH (US)

(72) Inventors: Yilin Hong, Beijing (CN); Zhiyun Zeng, Huizhou (CN)

(73) Assignee: The Procter & Gamble Company, Cincinnati, OH (US)

( * ) Notice: Subject to any disclaimer, the term of this patent is extended or adjusted under 35 U.S.C. 154(b) by 247 days.

(21) Appl. No.: 18/491,865

(22) Filed: Oct. 23, 2023

(65) Prior Publication Data

US 2024/0131547 A1 Apr. 25, 2024
US 2024/0226939 A9 Jul. 11, 2024

(30) Foreign Application Priority Data

Oct. 24, 2022 (WO) ................ PCT/CN2022/126915

(51) Int. Cl.
*B05B 11/10* (2023.01)
*B05B 11/00* (2023.01)

(52) U.S. Cl.
CPC ........ *B05B 11/1049* (2023.01); *B05B 11/105* (2023.01); *B05B 11/0094* (2013.01)

(58) Field of Classification Search
CPC ............. B05B 11/0081; B05B 11/1049; B05B 11/105; B05B 11/1067; B05B 11/1074; B05B 11/1087
See application file for complete search history.

(56) References Cited

U.S. PATENT DOCUMENTS 2,586,687 A 2/1952 Russell
D195,368 S 6/1963 Koenigsberg
D234,911 S 4/1975 Stevens
D392,887 S 3/1998 Wadsworth
(Continued)

FOREIGN PATENT DOCUMENTS

CN 306570643 5/2021
CN 214432500 U 10/2021
(Continued)

OTHER PUBLICATIONS

U.S. Appl. No. 29/876,964, filed May 31, 2023, Kenneth Shun Qiang Ang et al.

(Continued)

*Primary Examiner* — Jennifer C Chiang
(74) *Attorney, Agent, or Firm* — Alexandra S. Anoff

(57) ABSTRACT

A pump dispenser having a bottle with a neck and a pump assembly. The pump assembly includes an actuator, a closure connected to the actuator and coupled to the neck of the bottle, a dip tube, and a dual chamber pump. The dual chamber pump includes a piston assembly, a sealing cap, and a housing, which includes a pump chamber, a storage chamber having a cavity, and a core. The sealing cap is rigidly connected to the core and closes the storage chamber at a lower portion such that the substance to be released remains stored in the storage chamber cavity. When the actuator is pushed down for a first time by a user, a piston assembly moves to push down a connecting stem, which pushes down the sealing cap to open the storage chamber for releasing the substance contained in the storage chamber from the bottle.

14 Claims, 17 Drawing Sheets

(56) References Cited

U.S. PATENT DOCUMENTS

| | | | |
|---|---|---|---|
| D398,529 S | 9/1998 | Mascitelli | |
| D408,740 S | 4/1999 | Goss et al. | |
| D415,427 S | 10/1999 | Durliat | |
| D416,199 S | 11/1999 | Alguire et al. | |
| D419,446 S | 1/2000 | Durliat | |
| 6,126,032 A | 10/2000 | Herzog et al. | |
| D434,984 S | 12/2000 | Wadsworth | |
| D436,863 S | 1/2001 | Wadsworth et al. | |
| D452,822 S | 1/2002 | Boshuizen et al. | |
| D480,643 S | 10/2003 | Dretzka | |
| D499,966 S | 12/2004 | Arminak | |
| 6,840,408 B1 * | 1/2005 | Foster | B05B 11/1087 222/321.9 |
| D503,890 S | 4/2005 | Thunberg et al. | |
| D505,079 S | 5/2005 | Mulder et al. | |
| D507,486 S | 7/2005 | Wang | |
| D528,913 S | 9/2006 | Penfold et al. | |
| D534,808 S | 1/2007 | Haubert, III et al. | |
| D535,887 S | 1/2007 | Haubert, III et al. | |
| D547,655 S | 7/2007 | Van Der Heijden et al. | |
| D569,730 S | 5/2008 | Crabtree et al. | |
| D578,398 S | 10/2008 | Kuzma et al. | |
| D588,006 S | 3/2009 | Boes et al. | |
| D592,516 S | 5/2009 | Cummings et al. | |
| D618,108 S | 6/2010 | Renz et al. | |
| D669,788 S | 10/2012 | Maclean et al. | |
| D684,863 S | 6/2013 | Snyder | |
| D688,132 S | 8/2013 | Reynolds | |
| D730,733 S | 6/2015 | O'donahue | |
| D814,933 S | 4/2018 | Cutler | |
| D857,513 S | 8/2019 | Cannamela et al. | |
| D906,820 S | 1/2021 | Mandell et al. | |
| 11,267,009 B1 | 3/2022 | Cassoni et al. | |
| 11,338,310 B1 | 5/2022 | Gibboney et al. | |
| 11,660,627 B2 | 5/2023 | Bartolucci | |
| 2012/0132199 A1 | 5/2012 | Kiesewetter | |
| 2016/0325297 A1 | 11/2016 | Goettke | |
| 2021/0012362 A1 | 1/2021 | Tomarkin | |
| 2022/0234063 A1 | 7/2022 | Gibboney et al. | |
| 2022/0331825 A1 | 10/2022 | Fricker et al. | |

FOREIGN PATENT DOCUMENTS

| | | | |
|---|---|---|---|
| CN | 214932170 U | 11/2021 | |
| CN | 215303643 U | 12/2021 | |
| DE | 102020201285 A1 | 8/2021 | |
| KR | 20180060058 A | 6/2018 | |
| KR | 102116430 B1 * | 5/2020 | B65D 81/3222 |
| KR | 301075358.0000 | 9/2020 | |
| WO | 2012068398 A2 | 5/2012 | |
| WO | 2013142604 A1 | 9/2013 | |
| WO | D226473-001 | 12/2023 | |
| WO | D226473-002 | 12/2023 | |
| WO | D226473-003 | 12/2023 | |
| WO | D226473-004 | 12/2023 | |
| WO | D226473-005 | 12/2023 | |
| WO | D226473-007 | 12/2023 | |
| WO | D226473-009 | 12/2023 | |
| WO | D226473-013 | 12/2023 | |
| WO | D226473-015 | 12/2023 | |
| WO | D226473-016 | 12/2023 | |

OTHER PUBLICATIONS

U.S. Appl. No. 29/876,963, filed May 31, 2023, Kenneth Shun Qiang Ang et al.

All Office Actions; U.S. Appl. No. 29/876,964, filed May 31, 2023.

All Office Actions; U.S. Appl. No. 29/876,963, filed May 31, 2023.

24-410 White PP Plastic Smooth Teardrop Lotion Pumps, online retrieved from "https://www.berlinpackaging.com /24-410-white-pp-plastic-smooth-teardrop-lotion-pumps-299914/?", Year: 2025, 3 pages.

Dial Antibacterial Liquid Hand Soap, online retrieved from "https://www.amazon.com/Dial-Antibacterial-Liquid-VitaminOunces/dp/B0019CTF36", Year: 2025, 05 pages.

Equate Sensitive Skin Unscented Body Wash, online retrieved from "https://www.amazon.com/Equate-Sensitive-Skin-Unscented-Beauty/dp/B00NO41VV6", Year: 2025, 04 pages.

Segbeauty Lotion Dispenser Pump Head, 3 Pack Shower Bottle Pump Replacement, Plastic Tube Pump Top Set Fits Bottle Neck 1.2in Shampoo and Conditioner Dispenser Bathroom Kitchen, online retrieved from "https://www.amazon.com/ Segbeauty-Dispenser-Replacement-Conditioner Bathroom/dp/B0BRFYJKQ9?th=1", Year: 2023, 5 pages.

Softsoap 11.25-fl oz Fresh Citrus Antibacterial Hand Soap, online retrieved from "https://www.lowes.com/pd/Softsoap-11-25-fl-oz-Antibacterial-Fresh-Citrus-Hand-Soap/1000207977", Year: 2025, 02 pages.

White PP plastic 24-410 ribbed skirt down lock saddle head dispensing pump with 7.75inch dip tube (1.8—2 cc output) online retrieved from "https://www.containerandpackaging.com/products/ribbed-pump/DP834WH?", Year: 2025, 02 pages.

PCT Search Report and Written Opinion for PCT/CN2022/126915 dated Apr. 13, 2023, 09 pages.

* cited by examiner

PUMP DISPENSER

FIELD OF THE INVENTION

The present application generally relates to a pump dispenser comprising a bottle and a pump assembly. The pump assembly has a housing including a storage chamber. The storage chamber comprises a substance to be released in a formulation contained in the bottle.

BACKGROUND OF THE INVENTION

Pump dispensers are commonly used for dispensing various liquids including lotions, foams, gels, etc. Pump dispensers are fluid delivery systems for many consumer products such as shampoos, conditioners, body washes, hand soaps, hand sanitizers, facial cleansers, skin care compositions, scent products, dish detergents, surface cleaning products, plant care products, scent products, liquid food products, and the like.

A pump assembly of a pump dispenser typically dispenses liquid or gel from a bottle when a user pushes down on (or primes) an actuator, a piston puts pressure on a spring and moves a ball valve upward taking some liquid or gel with it. When the actuator is released, the piston and spring return to the resting positions, sealing off the housing chamber to stop liquid or gel from flowing back into the bottle, see for instance WO 2022/132693 A1.

Specific containers are needed to keep product ingredients separate to the formulation contained in a bottle until use for stability purposes, for extending shelf life of the product ingredients, or for enhancing product effectiveness. The specific containers differ from other containers where a product is premixed prior to shipping. Product ingredients that need to be separate from the formulation until use may be sensitive ingredients, a hair color to be separated from an oxidation agent, an active ingredient such as an anti-dandruff agent, a benefit agent such as silicone compounds, perfumes, incompatible agents, and the like. Skin benefits agent may be incompatible agent with a surfactant of the formulation because of a large amount of surfactant. Active ingredients may have additional benefits beyond cleansing benefits. For instance, active ingredients may be skin health or anti-acne ingredients, and the like, e.g. niacinamide, salicylic acid.

At present, the containers generally contain only one formula, and different contents are respectively placed in different containers. When a consumer wants to mix the contents of two or more different formulas for use, the contents need to be extracted respectively and then mixed for use.

Specific containers may have two compartments including independent vessels or storage compartments that can hold various combinations of fluids, powders, pastes that are stored in an separated stated until a user of the container mixes and uses the products. A two-component container can include two containers that are separate from each other and communicate with each other after the ejection of a stopper, wherein each container has a chamber for containing one component, with a thread on a neck of the one container and another thread which is connected to the other container, wherein the threads engage in one another and the one container can be screwed in relation to the other container in such a way that the stopper is pushed out of its retaining element, see for instance U.S. Pat. No. 6,126,032.

Hence, there is still a need of an improved pump dispenser which allows keeping product ingredients separate to the formulation contained in a bottle until use for stability purposes, for extending shelf life of the product ingredients, or for enhancing product effectiveness.

There is a need for providing a pump dispenser that can enable a wider usage of ingredients as it mitigates stability issues on shelves.

There is also a need for providing a pump dispenser that can elicit responses from users based on their impressions or feeling experiences during the mixing of the ingredients, such as form change (e.g. foam versus liquid), attractive ingredients (e.g. flowers or beads floating in liquid), and the like.

SUMMARY OF THE INVENTION

A pump dispenser 1 is provided and comprises a bottle 40 comprising a neck 41 having a neck landing zone; and a pump assembly 50. The pump assembly 50 comprises: an actuator 10 having a cavity therein; a closure 20 connected to the actuator 10 and coupled to the neck 41 of the bottle 40; a dip tube 30; and a dual chamber pump 60. The dual chamber pump 60 comprises a piston assembly 70, wherein the piston assembly 70 is in fluid communication with the actuator 10; a housing 80 including a pump chamber 81, a storage chamber 82 and a core 83; and a sealing cap 90. The pump chamber 81 has a cavity therein, wherein the pump chamber 81 has an upper portion 815 and a lower portion 816, wherein the piston assembly 70 is interior to the pump chamber 81 and slidably engaged with the pump chamber 81. The storage chamber 82 has a cavity therein, wherein the storage chamber 82 has an upper portion 824 and a lower portion 825, wherein the storage chamber cavity comprises a substance S to be released in a formulation F contained in the bottle 40. The core 83 has a cavity therein; wherein the core 83 is a sleeve protruding from the lower portion 816 of the pump chamber 81 through the storage chamber 82 towards the dip tube 30. The core 83 comprises a connecting stem 84. The sealing cap 90 is rigidly connected to the core 83 and closes the storage chamber 82 at the lower portion 825 of the storage chamber 82 such that the substance S to be released remains stored in the storage chamber cavity. When the actuator 10 is pushed down for a first time by a user, the piston assembly 70 moves to push down the connecting stem 84, which pushes down the sealing cap 90 to open the storage chamber 82 for releasing the substance S contained in the storage chamber 82 in the bottle 40.

A pump assembly 50 is provided and comprises: an actuator 10 having a cavity therein; a closure 20 connected to the actuator 10 and coupled to the neck 41 of the bottle 40; a dip tube 30; and a dual chamber pump 60. The dual chamber pump 60 comprises a piston assembly 70, wherein the piston assembly 70 is in fluid communication with the actuator 10; a housing 80 including a pump chamber 81, a storage chamber 82 and a core 83; and a sealing cap 90. The pump chamber 81 has a cavity therein, wherein the pump chamber 81 has an upper portion 815 and a lower portion 816, wherein the piston assembly 70 is interior to the pump chamber 81 and slidably engaged with the pump chamber 81. The storage chamber 82 has a cavity therein, wherein the storage chamber 82 has an upper portion 824 and a lower portion 825, wherein the storage chamber cavity comprises a substance S to be released in a formulation F contained in the bottle 40. The core 83 has a cavity therein; wherein the core 83 is a sleeve protruding from the lower portion 816 of the pump chamber 81 through the storage chamber 82 towards the dip tube 30. The core 83 comprises a connecting stem 84. The sealing cap 90 is rigidly connected to the core 83 and closes the storage chamber 82 at the lower portion

825 of the storage chamber 82 such that the substance S to be released remains stored in the storage chamber cavity. When the actuator 10 is pushed down for a first time by a user, the piston assembly 70 moves to push down the connecting stem 84, which pushes down the sealing cap 90 to open the storage chamber 82 for releasing the substance S contained in the storage chamber 82.

A method of releasing a substance S in a formulation F contained in a bottle 40 of a pump dispenser 1 as disclosed herein is provided and comprises the following steps, preferably in that order:

a) filling a substance S to be released in a storage chamber 82 of a dual chamber pump 60 of a pump assembly 50;
b) closing the storage chamber 82 with a sealing cap 90;
c) securing a closure 20 of the pump assembly 50 to the bottle 40 to provide the pump dispenser 1;
d) triggering an actuator 10 of the pump assembly 50 which triggers by sequence a piston assembly 70 of the dual chamber pump 60, a connecting stem 84 and the sealing cap 90 of the dual chamber pump 60, such that when the actuator 10 is pushed down for a first time by a user, the piston assembly 70 moves to push down the connecting stem 84, which pushes down the sealing cap 90 to open the storage chamber 82 for releasing the substance S contained in the storage chamber 82;
e) shaking the bottle 40 to mix the substance S with the formulation F contained in the bottle 40 to form a final composition FC; and
f) triggering the actuator 10 to dispense the final composition FC from an actuator outlet 15.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DETAILED DESCRIPTION OF THE INVENTION

Definitions of Terms

Figure 1:
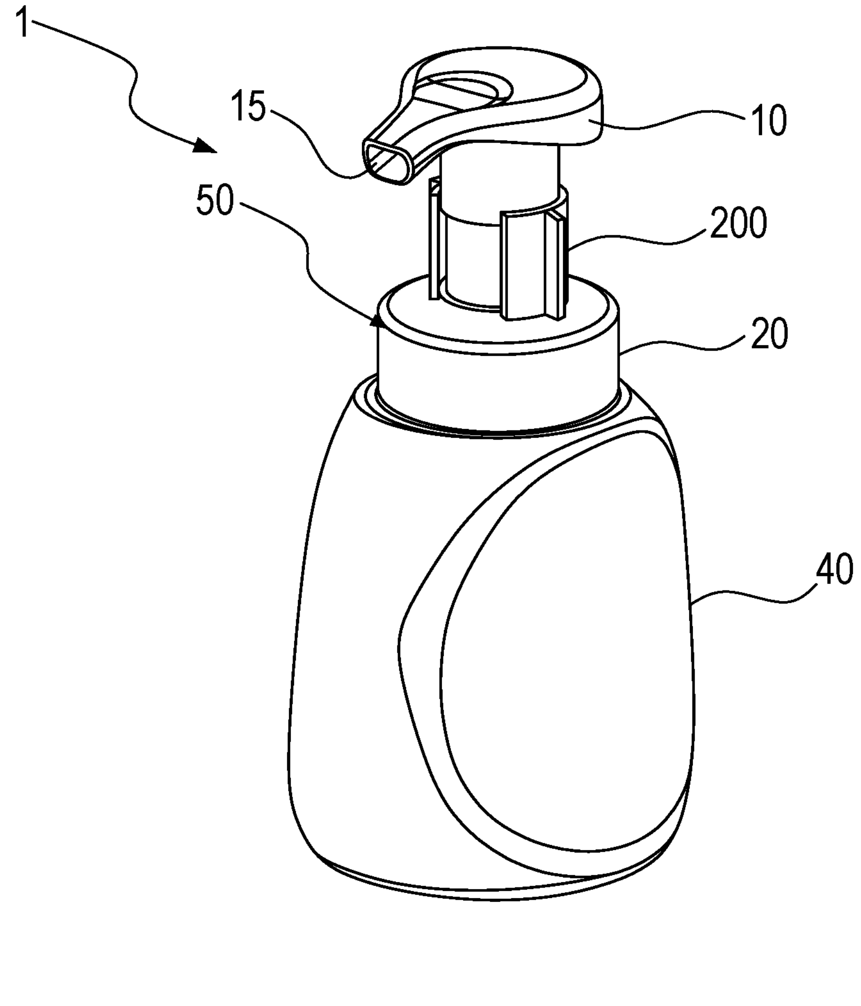
FIG. 1 provides a perspective view of a pump dispenser as shown and described herein.

In this document, including in all embodiments of all aspects of the present invention, the following definitions apply unless specifically stated otherwise.

The terms “comprise”, “comprising”, and “comprises” as used herein are open ended terms, each specifying the presence of what follows, e.g., a component, but not precluding the presence of other features, e.g., elements, steps or components known in the art, or disclosed herein. “Comprising” encompasses the terms “consisting of” and “consisting essentially of”. The pump dispensers, pump assemblies, methods, uses, and processes described herein can comprise, consist of, and consist essentially of the elements and limitations described herein, as well as any of the additional or optional ingredients, components, steps, or limitations described herein. Embodiments and aspects described herein may comprise or be combinable with elements, features or components of other embodiments and/or aspects despite not being expressly exemplified in combination, unless an incompatibility is stated.

As used herein, the articles including “a” and “an” when used in a claim, are understood to mean “one or more” of what is claimed or described.

The terms “include,” “includes,” and “including,” as used herein are meant to be non-limiting.

The term “consumer product” as used herein means products intended to be used or consumed in the form in which it is sold. Such products include but are not limited to products for and/or uses relating to treating as a surface of interest, keratin fibers, hair, skin or fabrics. As used herein “consumer product” means baby care, beauty care, fabric & home care, family care, feminine care, health care, snack and/or beverage products or devices intended to be used or consumed in the form in which it is sold, and not intended for subsequent commercial manufacture or modification. Such products include but are not limited to fine fragrances (e.g. perfumes, colognes, eau de toilettes, after-shave lotions, pre-shave, face waters, tonics, and other fragrance-containing compositions for application directly to the skin), diapers, bibs, wipes; products for and/or methods relating to treating human hair, including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; products and/or methods relating to oral care including toothpastes, tooth gels, tooth rinses, denture adhesives, tooth whitening; over-the-counter health care including cough and cold remedies, and pain relievers.

The term "cleaning composition" as used herein includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

The term "fabric care composition" as used herein includes, unless otherwise indicated, fabric softening compositions, fabric enhancing compositions, fabric freshening compositions and combinations thereof. The form of such compositions includes liquids, gels, beads, powders, flakes, and granules.

The term "personal cleansing composition" as used herein refers to compositions intended for topical application to the hair and the skin for cleansing.

The term "mixtures" as used herein is meant to include a simple combination of materials and any compounds that may result from their combination.

The term "substance" as used herein refers to any ingredient, composition that needs to be kept separate from the formulation contained in the bottle. Suitable ingredients may be but not limited to sensitive ingredients, active ingredients, benefit agents or incompatible agents.

The term "surface of interest" as used herein refers to hair when the composition is a cleaning composition in the form of a hair shampoo, or a hair conditioner; alternatively to skin when the cleaning composition is in the form of a personal care product such as a shower or bath cream, a body wash or foaming body wash; alternatively to fabrics such as a liquid detergent or a fabric softener.

All percentages are by weight (w/w) of formulation or the final composition or the pump dispenser or the pump assembly, unless otherwise specified. "% wt." means percentage by weight. References to 'parts' e.g. a mixture of 1 part X and 3 parts Y, is a ratio by weight. All ratios or percentages are weight ratios or weight percentages unless specifically stated otherwise.

Where amount ranges are given, these are to be understood as being the total amount of said ingredient in the composition (substance, formulation, or final composition), the consumer product or the package component (pump dispenser, pump assembly), or where more than one species fall within the scope of the ingredient definition, the total amount of all ingredients fitting that definition, in the composition, the consumer product or the package component.

The amount of each particular ingredient or mixtures thereof described hereinafter can account for up to 100% (or 100%) of the total amount of the ingredient(s) in the composition, the consumer product or the package component.

The term "free of" as used herein means that a specific ingredient of a composition or a component of the pump dispenser or the pump assembly, e.g., the pump dispenser comprises 0% of an ingredient by total weight of specific component of the pump dispenser thus no detectable amount of the stated ingredient.

The term "substantially free of" as used herein means less than 1%, less than 0.8%, less than 0.5%, less than 0.3%, or less than an immaterial amount of a stated ingredient by total weight of composition or the pump dispenser or the pump assembly.

The term "room temperature" refers to a temperature of 25° C.

All measurements are understood to be made at 25° C. and at ambient conditions, where "ambient conditions" means at 1 atmosphere (atm) of pressure and at 65% relative humidity, unless otherwise stated. "Relative humidity" refers to the ratio (stated as a percent) of the moisture content of air compared to the saturated moisture level at the same temperature and pressure. Relative humidity can be measured with a hygrometer, in particular with a probe hygrometer from VWR® International.

The pumps dispensers, pump assemblies and methods of releasing a substance in a formulation contained in a bottle of a pump dispenser as described in the Summary or as described hereinbelow for fulfilling the technical effects or goals as set out herein. These objects and other advantages as may be apparent to those skilled in the art can be achieved through the pumps dispensers, pump assemblies, and methods described herein.

Pump Dispenser

A pump dispenser 1 is provided and comprises a bottle 40 comprising a neck 41 having a neck landing zone; and a pump assembly 50.

FIG. 1 provides a perspective view of a pump dispenser 1 that includes a bottle 40 coupled to a pump assembly 50 in a locked storage position. The pump assembly 50 includes an actuator 10 and a closure 20. The closure 20 is connected to the actuator 10. More specifically, the closure 20 is coupled to the neck 41 of the bottle 40. The closure 20 may be threadingly engaged with the neck 41 of the bottle 40. Liquid or gel discharged from the pump dispenser 1 is discharged through an actuator outlet 15 of the actuator 10.

The pump dispenser 1 may further comprise a clip 200 to lock the actuator 10 before a first use, wherein the clip 200 is positioned between the actuator 10 and the closure 20.

Alternatively, the actuator 10 may be typically auto-locked. In that aspect, the actuator 10 may be typically unlocked by rotating the actuator at 90 degrees.

Pump Assembly

The pump assembly 50 of the pump dispenser 1 comprises an actuator 10 having a cavity therein; a closure 20 connected to the actuator 10 and coupled to the neck 41 of the bottle 40; a dip tube 30; and a dual chamber pump 60.

Figure 2:
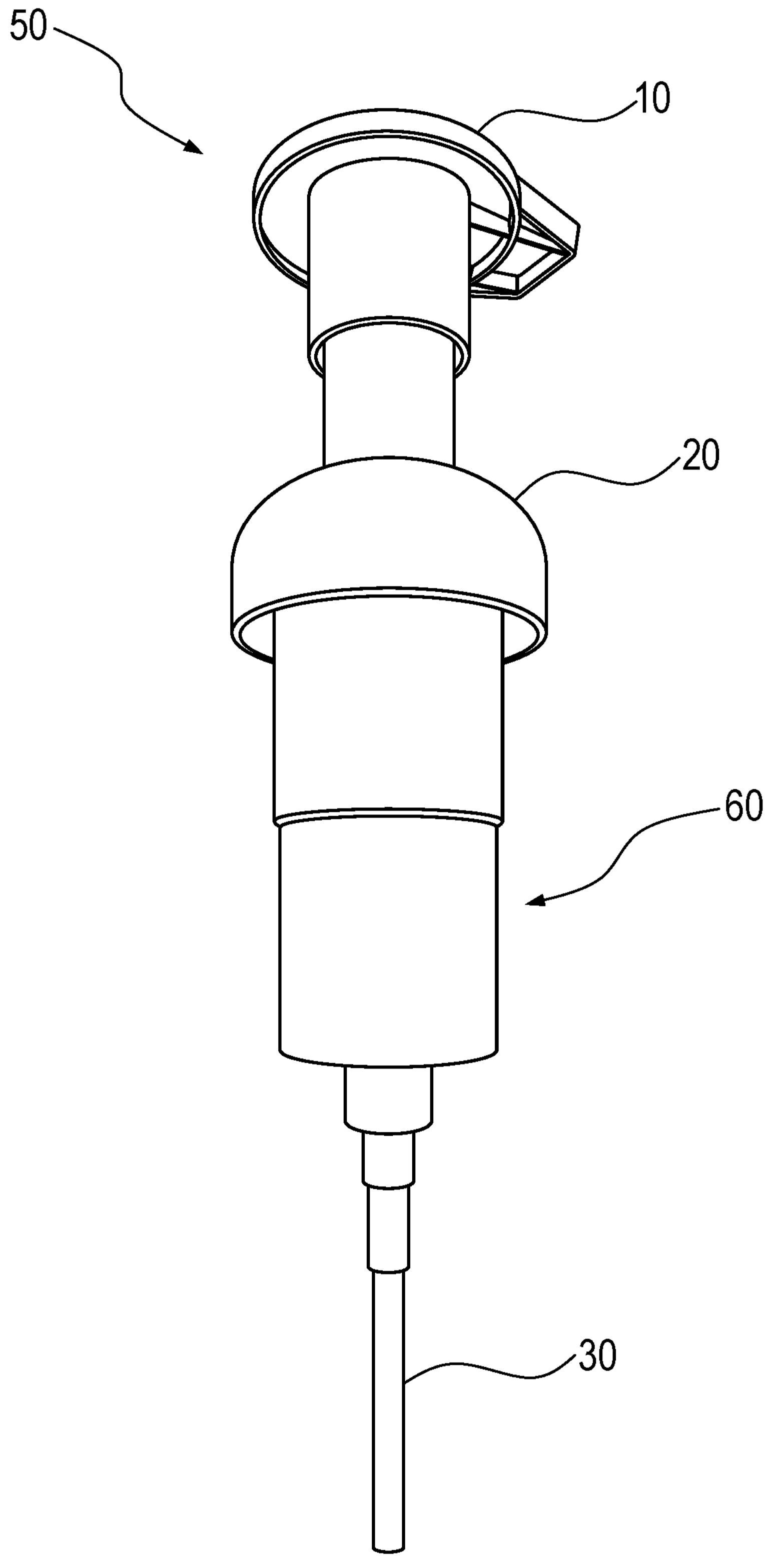
FIG. 2 provides a perspective view of a pump assembly according to one or more aspects.

FIG. 2 provides a perspective view of a pump assembly 50 including an actuator 10, a closure 20 connected to the actuator 10, a dip tube 30, and a dual chamber pump 60.

The dip tube 30 may provide for fluid communication between a final composition FC in a form such as a liquid or gel contained in the bottle 40 and the dual chamber pump 60. The dip tube 30 may have a lower end that resides in liquid or gel in the bottle 40 and an upper end that is connected to the dual chamber pump 60, especially the sealing cap 90, alternatively at a sub-stem 95 of the sealing cap 90. Liquid or gel may be transported through the dip tube 30 by way of a difference in pressure between the lower end and the upper end of the dip tube 30. The pressure difference may be provided by a pump applying suction to the upper end of the dip tube 30. The dip tube 30 may be ordinary flexible plastic tubing.

The dual chamber pump 60 comprises a piston assembly 70, wherein the piston assembly 70 is in fluid communication with the actuator 10.

The dual chamber pump 60 also comprises a housing 80 including a pump chamber 81, a storage chamber 82 and a core 83.

The pump chamber 81 has a cavity therein. The pump chamber 81 has an upper portion 815 and a lower portion 816. The piston assembly 70 is interior to the pump chamber 81 and slidably engaged with the pump chamber 81.

The storage chamber 82 has a cavity therein. The storage chamber 82 has an upper portion 824 and a lower portion 825. The storage chamber cavity comprises a substance S to be released in a formulation F contained in the bottle 40.

The core 83 has a cavity therein. The core 83 is a sleeve protruding from the lower portion 816 of the pump chamber 81 through the storage chamber 82 towards the dip tube 30.

The core 83 comprises a connecting stem 84.

The dual chamber pump 60 also comprises sealing cap 90. The sealing cap 90 is rigidly connected to the core 83 and closes the storage chamber 82 at the lower portion 825 of the storage chamber 82 such that the substance S to be released remains stored in the storage chamber cavity.

When the actuator 10 is pushed down for a first time by a user, the piston assembly 70 moves to push down the connecting stem 84, which pushes down the sealing cap 90 to open the storage chamber 82 for releasing the substance S contained in the storage chamber 82 in the bottle 40.

Housing

As shown for instance in FIGS. 3-6 or FIGS. 7-9, the dual chamber pump 60 comprises a housing 80 including a pump chamber 81, a storage chamber 82 and a core 83.

Figure 4:
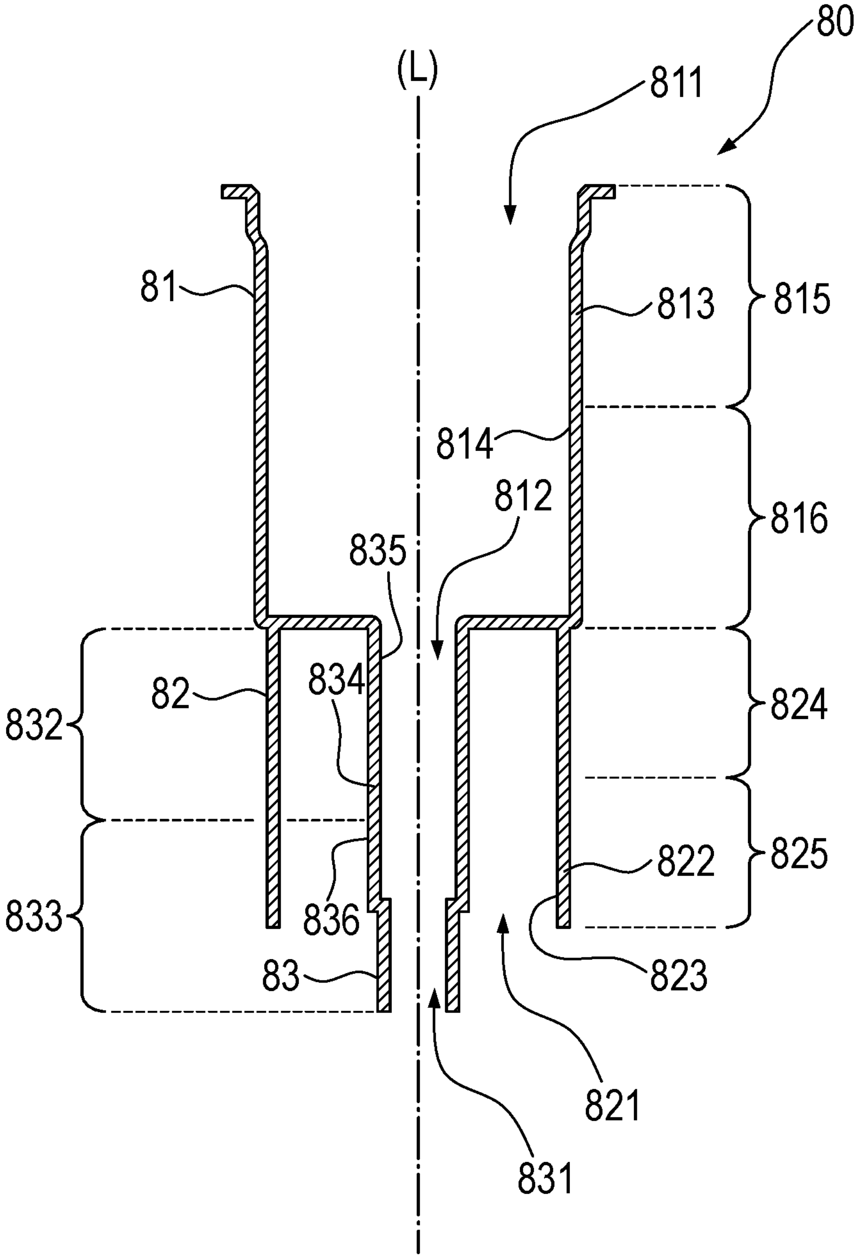
FIG. 4 provides a cross-sectional view of the housing of FIG. 3.

The housing 80 may have an open top and an open bottom, as shown for instance in a FIG. 4. FIG. 4 provides a cross-sectional view of the housing 80 applicable to any aspects disclosed herein.

The pump chamber 81 of the housing 80 may have an open top 811 and an open bottom 812. The open top of the housing 80 may be the same open top 811 of the pump chamber 81. The pump chamber 81 of the housing 80 may have a side wall 813 having an inner surface 814. The pump chamber 81 has a cavity therein. The pump chamber 81 has an upper portion 815 and a lower portion 816.

The piston assembly 70 is interior to the pump chamber 81 and slidably engaged with the pump chamber 81. The piston assembly 70 of the dual chamber pump 60 may be axially oriented within the housing 80 and mounted through the open top 811 of the pump chamber 81 into the pump chamber 81. The piston assembly 70 may be coaxial to a longitudinal axis L. The piston assembly 70 will be described in more details hereinafter.

The storage chamber 82 of the housing 80 may have an open top and an open bottom 821. The open top of the storage chamber 82 may be the same as the open bottom 812 of the pump chamber 81. The storage chamber 82 of the housing 80 may have a side wall 822 having an inner surface 823. The storage chamber 82 has a cavity therein. The storage chamber 82 has an upper portion 824 and a lower portion 825. The storage chamber cavity comprises a substance S to be released in a formulation F contained in the bottle 40.

In the reasonably practical and preferred arrangement, the storage chamber 82 may be located below the pump chamber 81.

The pump chamber 81 is filled with air while the storage chamber 82 is filled with the substance S.

Alternatively, however as less preferred, the storage chamber 82 may surround the pump chamber 81 such that the pump chamber 81 is interior to the storage chamber 82.

Figure 14:
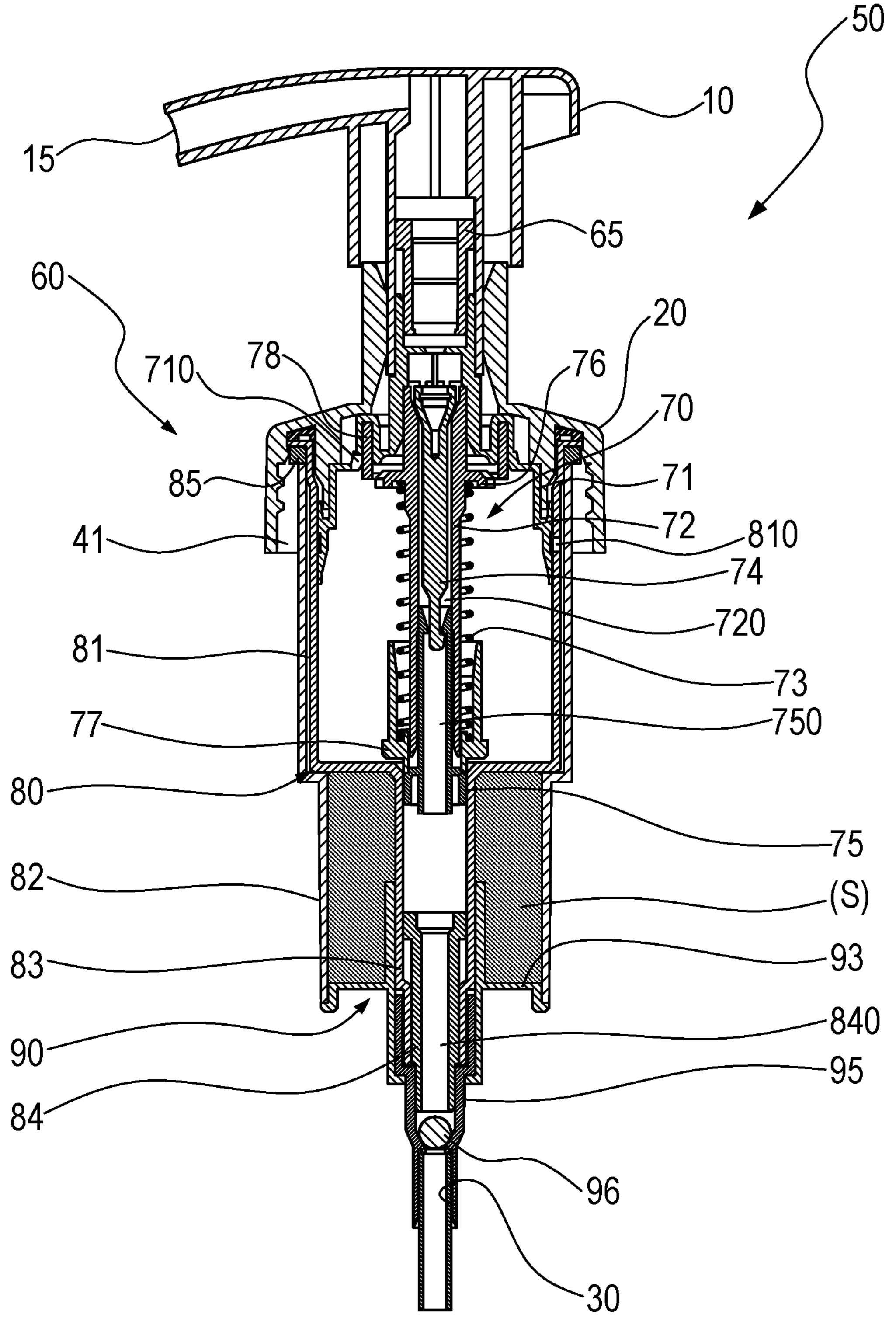
FIG. 14 provides a cross-sectional view of another pump assembly, wherein the storage chamber surrounds the pump chamber according to one or more aspects.

FIG. 14 provides a cross-sectional view of another pump assembly 50, wherein the storage chamber 82 surrounds the pump chamber 81.

In that aspect, having the storage chamber 82 surrounding the pump chamber 81 requires an increase in size of the closure 20 of the pump assembly 50 and the corresponding neck 41 of the bottle 40.

The housing 80 of the dual chamber pump 60 has a core 83. The core 83 has a cavity therein. The core 83 is a sleeve protruding from the lower portion 816 of the pump chamber 81 through the storage chamber 82 towards the dip tube 30.

In other words, the core 83 may be a sleeve protruding from the open bottom 812 of the pump chamber 81 towards the open bottom 821 of the storage chamber 82, preferably towards and beyond the open bottom 821 of the storage chamber 82. The core 83 may form a central opening coaxial to the longitudinal axis L.

The core 83 may have an open top and an open bottom 831. The open top of the core 83 may be the same as the open bottom 812 of the pump chamber 81. The core 83 may have an upper portion 832 and a lower portion 833.

The core 83 of the housing 80 may have a side wall 834 having an inner surface 835 and an outer surface 836. The core 83 of the housing 80 may have an inner shape defined by the inner surface 835 of the core 83, wherein the inner shape of the coupling sleeve 83 is cylindrical.

The core 83 of the housing 80 may be integrally formed with the inner surface 814 of the pump chamber 81.

The core 83 comprises a connecting stem 84. The connecting stem 84 may have a hollow inner cavity 840 in fluid communication with the dip tube 30.

Figure 5:
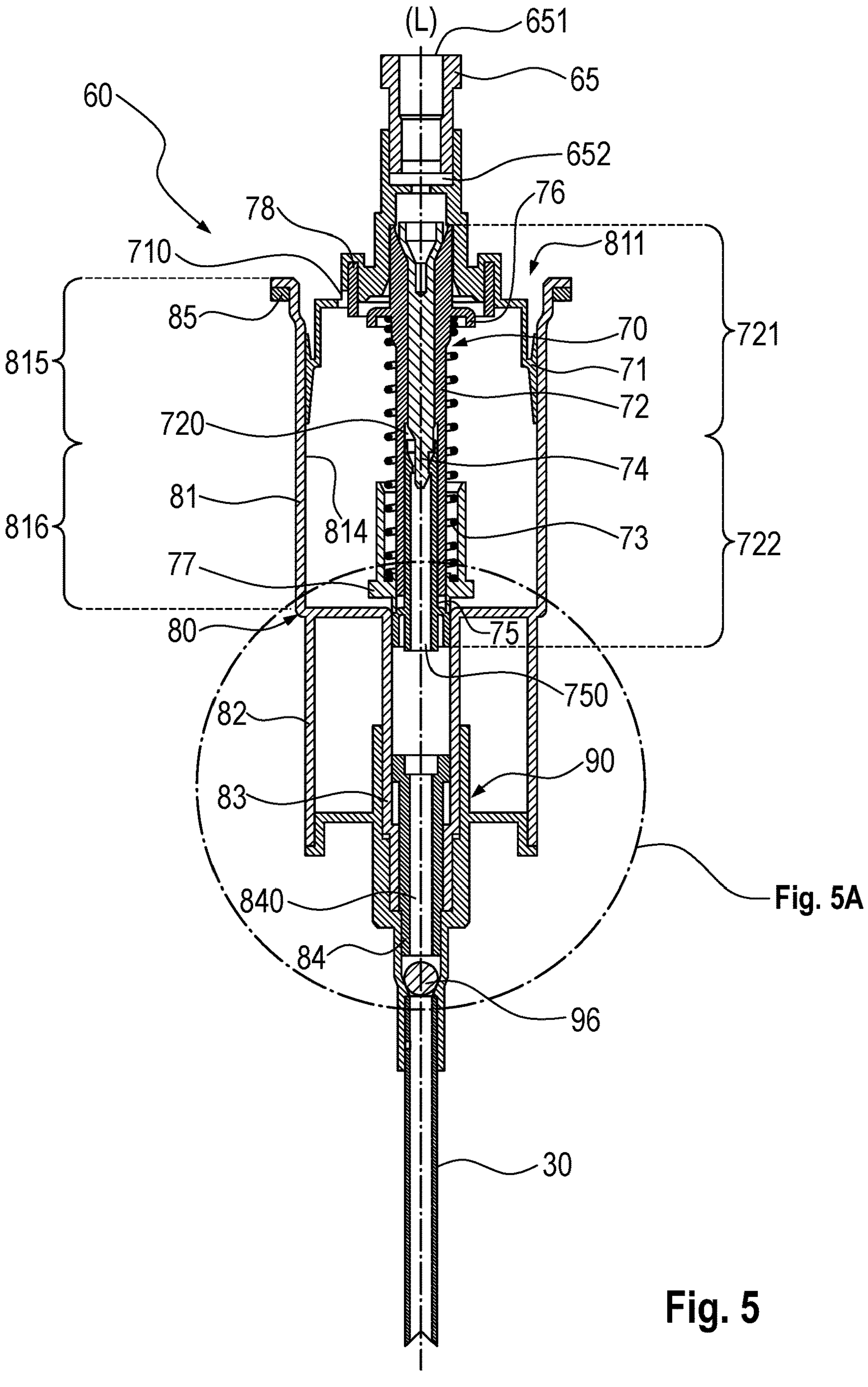
FIG. 5 provides a cross-sectional view of the dual chamber pump of FIG. 3.
Figure 8:
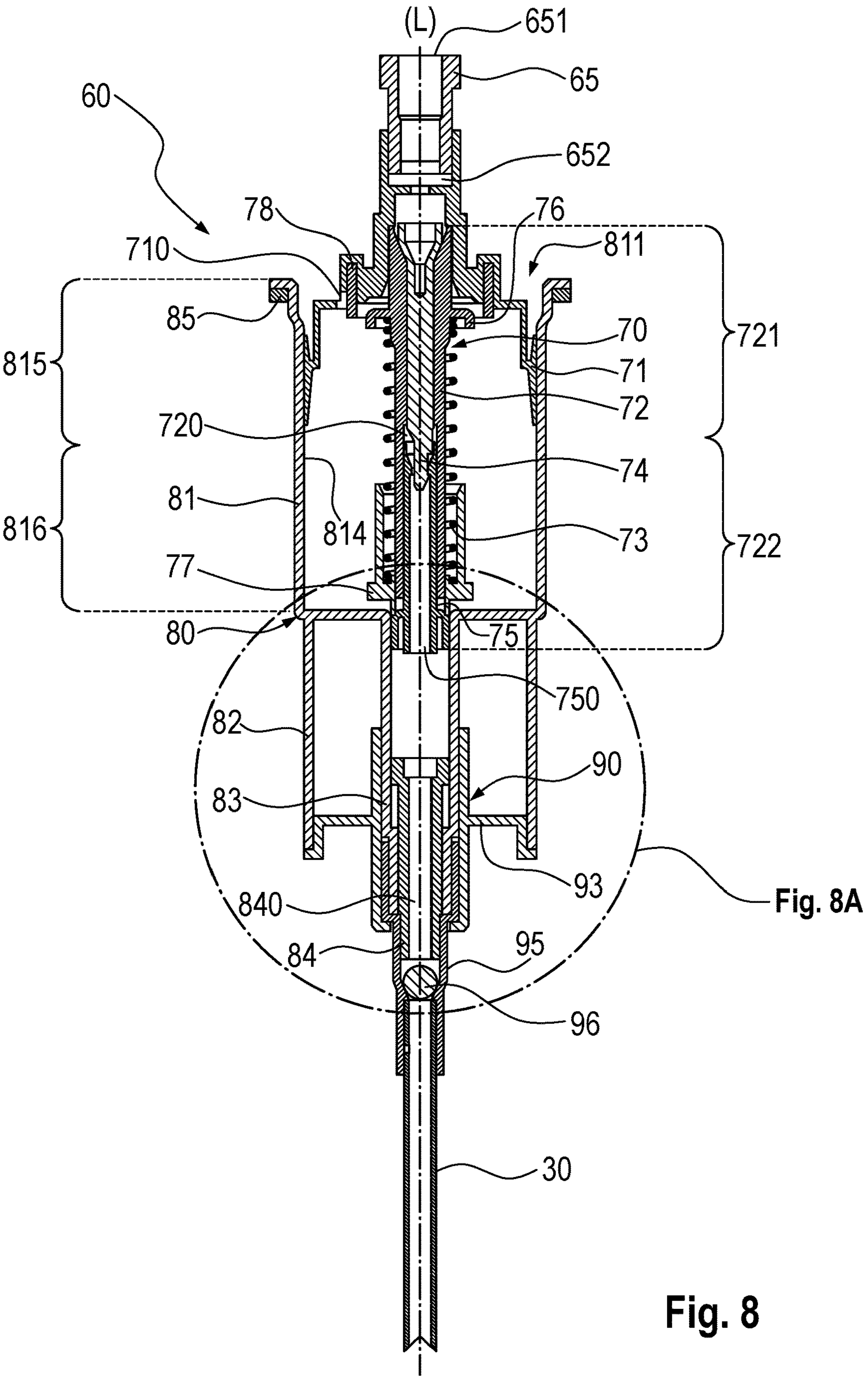
FIG. 8 provides a cross-sectional view of the dual chamber pump of FIG. 7.

The connecting stem 84 may have an upper portion having a diameter. The diameter of the upper portion of the connecting stem 84 may be greater than a lowest diameter of the lower portion 833 of the core 83. In that aspect, the connecting stem 84 will remain positioned within the core 83, as shown in FIG. 5 or FIG. 8. Hence, the connecting stem 84 can remain within the core 83.

The different parts of the housing 80, namely, the pump chamber 81, the storage chamber 82 and the core 83 are not limited to a cylindrical tube per se. The pump chamber 81, the storage chamber 82 and/or the core 83 may have any suitable outer shape, including, e.g., a generally cylindrical shape, a generally conical shape, a generally elliptical shape, or any combination thereof. As used herein, the terms "generally cylindrical", "generally conical" and "generally elliptical" describe shapes strictly cylindrical, conical and elliptical and those deviating from strictly cylindrical, conical and elliptical shapes. Examples of such "generally cylindrical" and "generally conical" or "generally elliptical" may include, without limitation, the pump chamber 81, the storage chamber 82 and/or the core 83 having a cross-sectional shape deviating from circular by being elongated in a direction transverse to the longitudinal axis, e.g., elliptical, oval, and the like. Other suitable shapes might be encompassed but less preferred, e.g., polygonal, rectangular prism, cuboid, and so on or a combination of generally cylindrical/conical and polygonal shapes.

Sealing Cap

The sealing cap 90 may have two alternative constructions. The sealing cap 90 of the dual chamber pump 60 may be a single piece. The sealing cap 90 may be rigidly connected to the core 83 at or adjacent to the lower portion 825 of the storage chamber 82. The dip tube 30 may be rigidly connected to the sealing cap 90. The sealing cap 90 may wrap a portion of the core 83 such that when the actuator 10 is pushed down for a first time by the user, the piston assembly 70 moves to push down the connecting stem 84, which pushes down the sealing cap 90 to open the storage chamber 82 for releasing the substance S contained in the storage chamber 82 in the bottle 40. In that aspect, the sealing cap 90 remains engaged with the core 83 and do not fall in the bottle 40.

Figure 3:
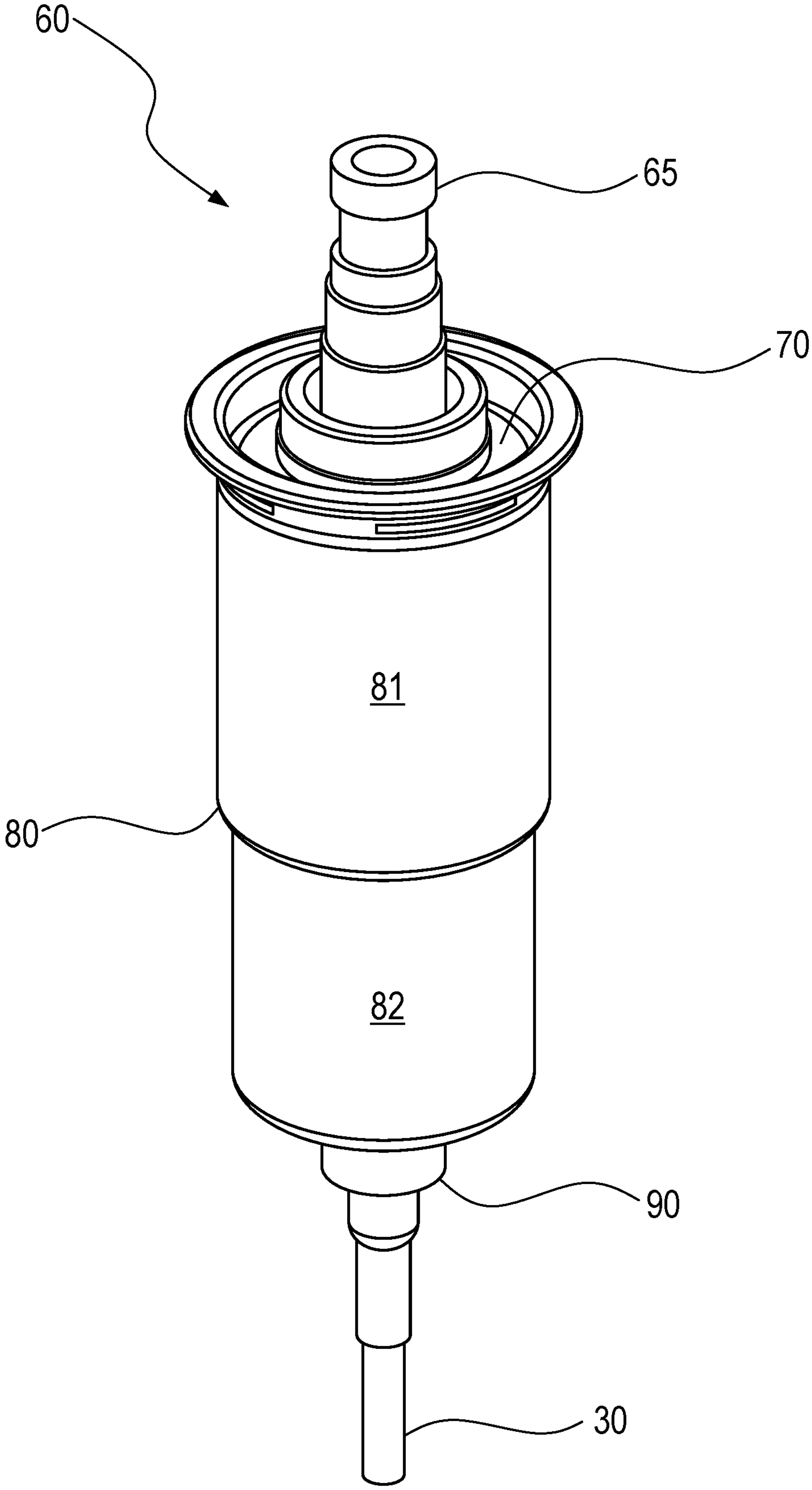
FIG. 3 provides a front perspective view of a dual chamber pump according to one or more aspects.
Figure 5A:
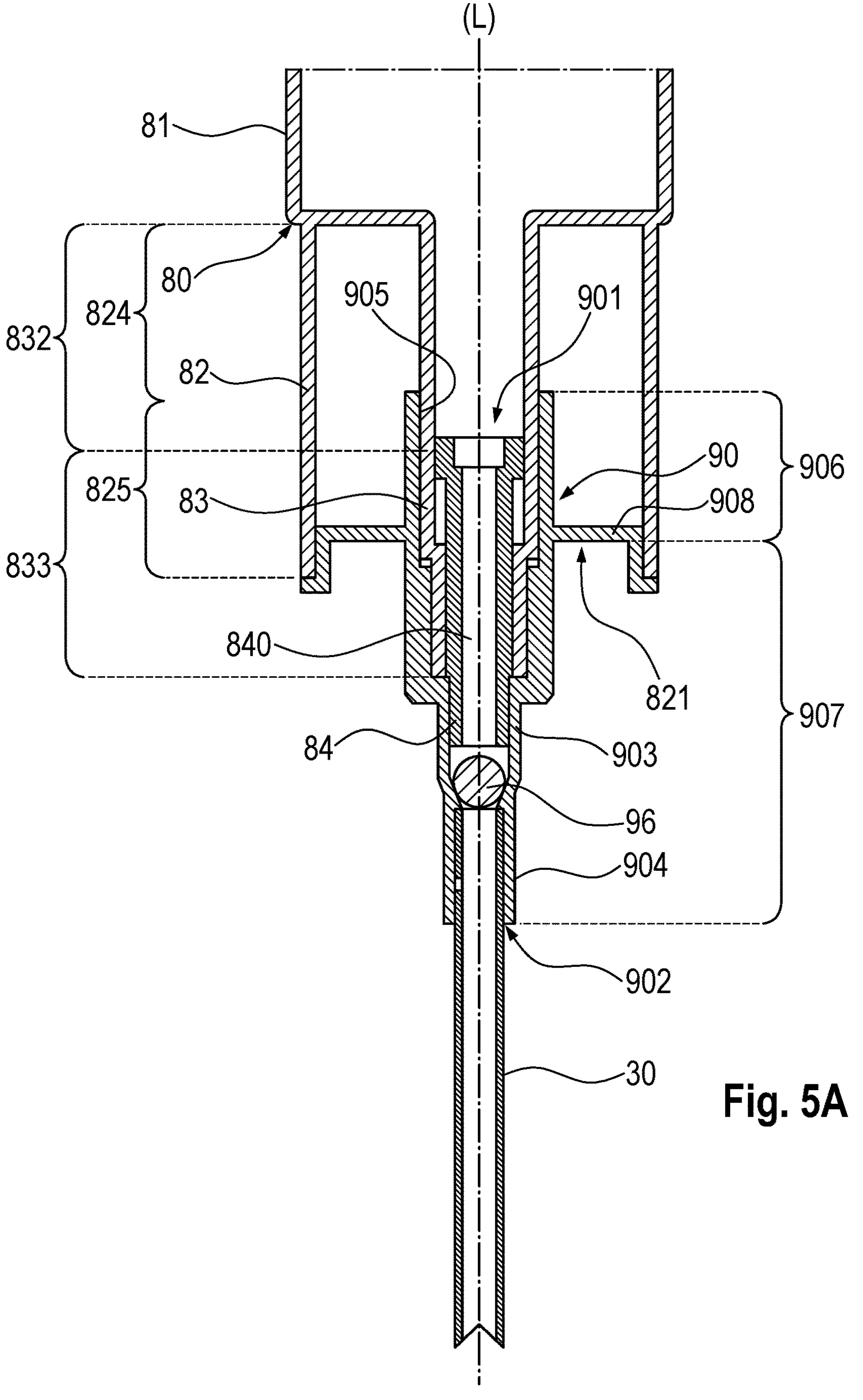
FIG. 5A provides an enlarged view of an area of FIG. 5 including a sealing cap of a dual chamber pump, according to one or more aspects.
Figure 6:
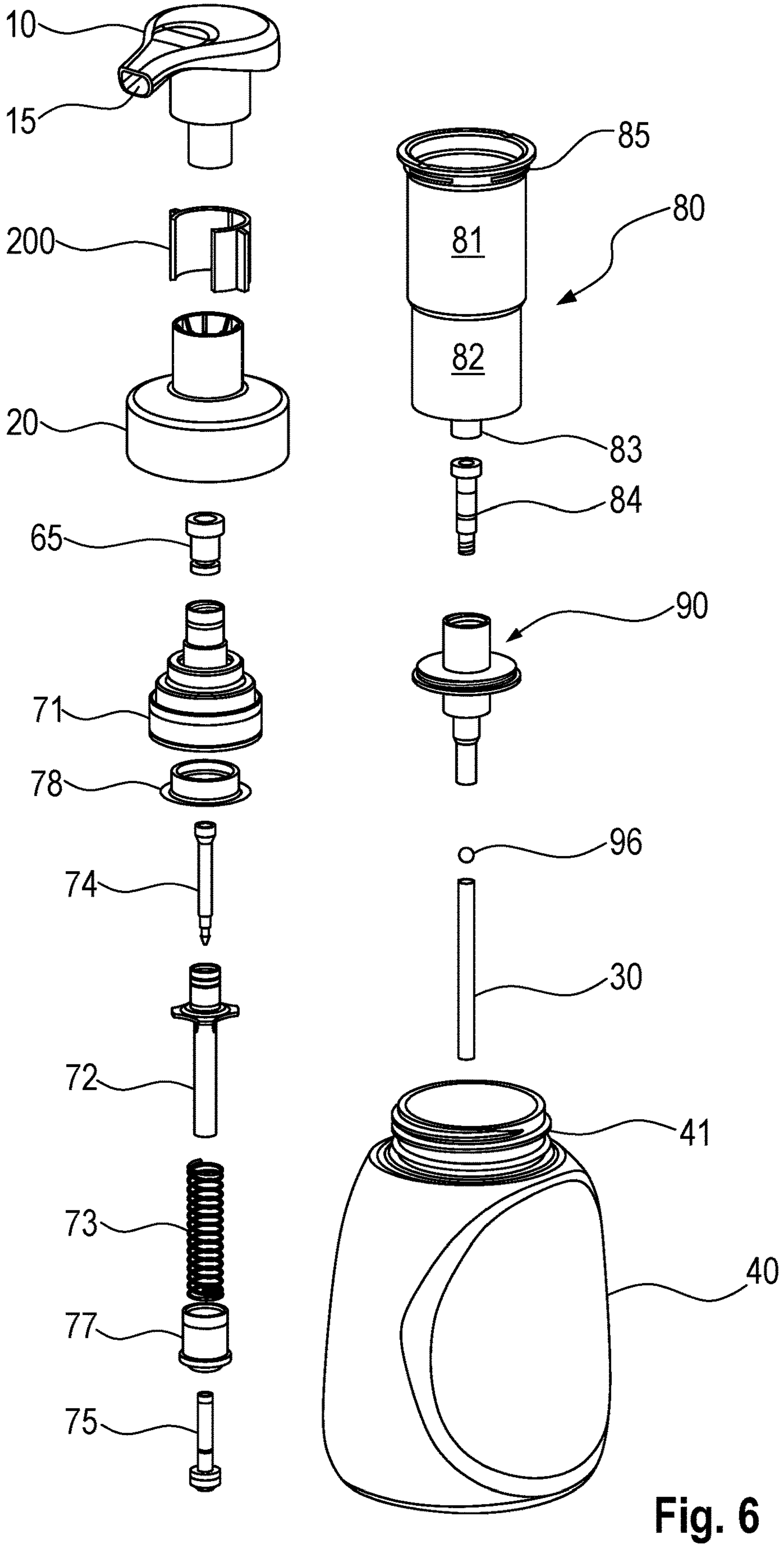
FIG. 6 provides an exploded view of the pump dispenser including the dual chamber pump of FIG. 3 in disassembled form, according to one or more aspects.

FIG. 3 provides a front perspective view of a dual chamber pump 60 including a sealing cap 90 that is a single piece. FIG. 5 provides a cross-sectional view of the dual chamber pump 60 of FIG. 3. FIG. 5A provides an enlarged view of an area of FIG. 5 including a single piece type sealing cap 90 of a dual chamber pump 60. FIG. 6 provides an exploded view of the pump dispenser 1 including the dual chamber pump 60 of FIG. 3 in disassembled form.

As shown in FIG. 3, the dual chamber pump 60 includes a piston assembly 70; a housing 80; and a sealing cap 90. The housing 80 of the dual chamber pump 60 includes a pump chamber 81 and a storage chamber 82. The sealing cap 90 is connected to the dip tube 30. As described more in details below, the dual chamber pump 60 may further comprise a mesh 65.

As shown in FIG. 5 and FIG. 5A, the sealing cap 90 of the dual chamber pump 60 may be a single piece. The sealing cap 90 is rigidly connected to the core 83 at or adjacent to the lower portion 825 of the storage chamber 82. The dip tube 30 is rigidly connected to the sealing cap 90. The sealing cap 90 wraps a portion of the core 83. Especially, the sealing cap 90 wraps the lower portion 833 of the core 83.

The sealing cap 90 may be a sleeve having an open top 901 and an open bottom 902. The sealing cap 90 may have a side wall 903 having an outer surface 904 and an inner surface 905. The sealing cap 90 may have a upper portion 906 and a lower portion 907. The upper portion 906 and the lower portion 907 of the sealing cap 90 may be separated by an annular ring 908. The annular ring 908 of the sealing cap 90 may protrude from the outer surface 904 of the side wall 903 of the sealing cap 90. The sealing cap 90 forms a central opening coaxial to the longitudinal axis L, as shown for instance in FIG. 5A.

The upper portion 906 of the sealing cap 90 may have a diameter greater than a diameter of the lower portion 907 of the sealing cap 90.

The sealing cap 90 may be rigidly connected to the core 83 at or adjacent to the lower portion 825 of the storage chamber 82. In that case, the side wall 903 at the upper portion 906 of the sealing cap 90 is engaged with or wraps a portion of the lower portion 833 of the core 83, alternatively a portion of the upper and lower portions (832, 833) of the core 83, such that the annular ring 908 closes the open bottom 821 of the storage chamber 82. In that aspect, the substance S contained in the storage chamber 82 can be kept separate from the formulation F contained in the bottle 40. Hence, the stability of the formulation F and/or the substance S can be ensured. The product ingredients contained in the substance S or the formulation F can have an extended shelf life and contribute for enhancing product effectiveness.

The dip tube 30 may be rigidly connected to the sealing cap 90. The dip tube 30 may be inserted in the open bottom 902 of the sealing cap 90. A portion of the lower portion 907 of the sealing cap 90 may wrap a portion of the core 83, namely at a portion of the lower portion 833 of the core 83.

FIG. 6 shows how the different components of the pump dispenser can be inserted and connected together. The connecting stem 84 is introduced in the core 83. The piston assembly 70 as described more in details below is inserted in the pump chamber 81. Beforehand the piston assembly 70 is mounted. For this, a spring 73 is positioned in a spring seat 77. A pull stick 74 within a piston rod 72 is introduced within the spring 73. A piston tip 75 is inserted in an open bottom of the piston rod 72 to close the open bottom of the piston rod 72 and an open bottom of the spring seat 77. An open top of the piston rod 72 is connected to the piston skirt 71 and a diaphragm 78. A mesh 65 is connected to the piston skirt 71. Then, the dual chamber pump 60 is connected to a closure 20. An actuator 10 having an outlet 15 is inserted in the closure 20, optionally with a clip 200.

Then, an inlet one-way valve 96 is introduced from the open top 901 of the sealing cap 90. The dip tube 30 is connected at the open bottom 902 of the sealing cap 90.

The substance S is added in the storage chamber 82 from the open bottom 821 of the storage chamber 82. The sealing cap 90 closes the lower portion 825 of the storage chamber 82 after the substance S has been added to the storage chamber 82. The sealing cap 90 also closes an open bottom of the connecting stem 84 within the core 83.

The resulting pump assembly 50 is then inserted and engaged, e.g. threadingly screwed, with a bottle 40 containing the formulation F.

Alternatively, the sealing cap 90 may comprise an upper cap 93 and a sub-stem 95. The sub-stem 95 may be rigidly connected to the core 83 at or adjacent to the lower portion 825 of the storage chamber 82. The dip tube 30 may be rigidly connected to the sub-stem 95. The upper cap 93 may wrap a portion of the core 83 and a portion of the sub-stem 95, such that when the actuator 10 is pushed down for a first time by the user, the piston assembly 70 moves to push down the connecting stem 84, which pushes down the upper cap 93 and the sub-stem 95 of the sealing cap 90 both together to open the storage chamber 82 for releasing the substance S contained in the storage chamber 82 in the bottle 40. In that aspect, the upper cap 93 and the sub-stem 95 remain both engaged with the core 83 and do not fall in the bottle 40.

The sub-stem 95 may wrap a portion of the connecting stem 84 and a portion of the core 83.

Figure 7:
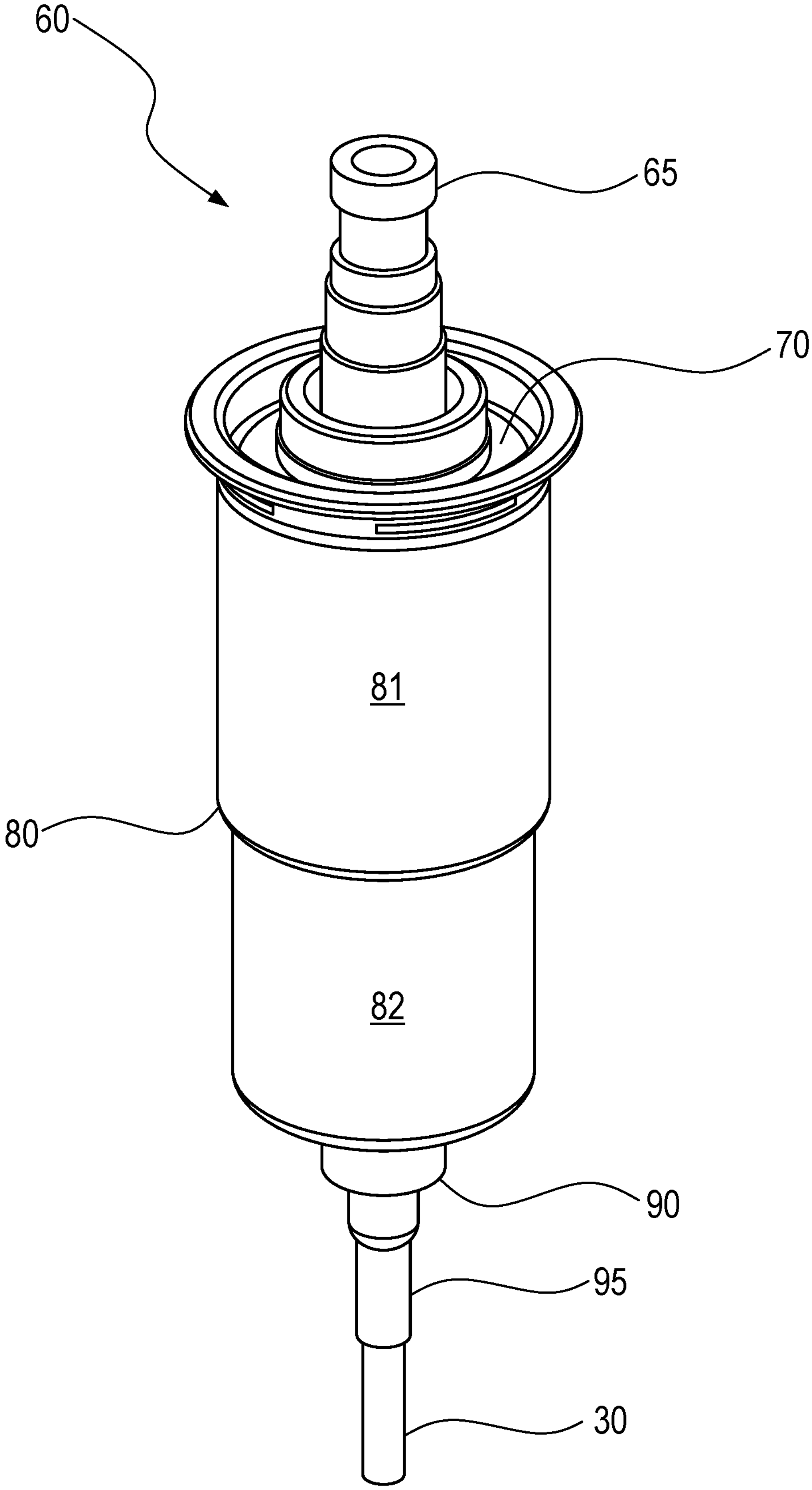
FIG. 7 provides a front perspective view of another dual chamber pump according to one or more aspects.
Figure 8A:
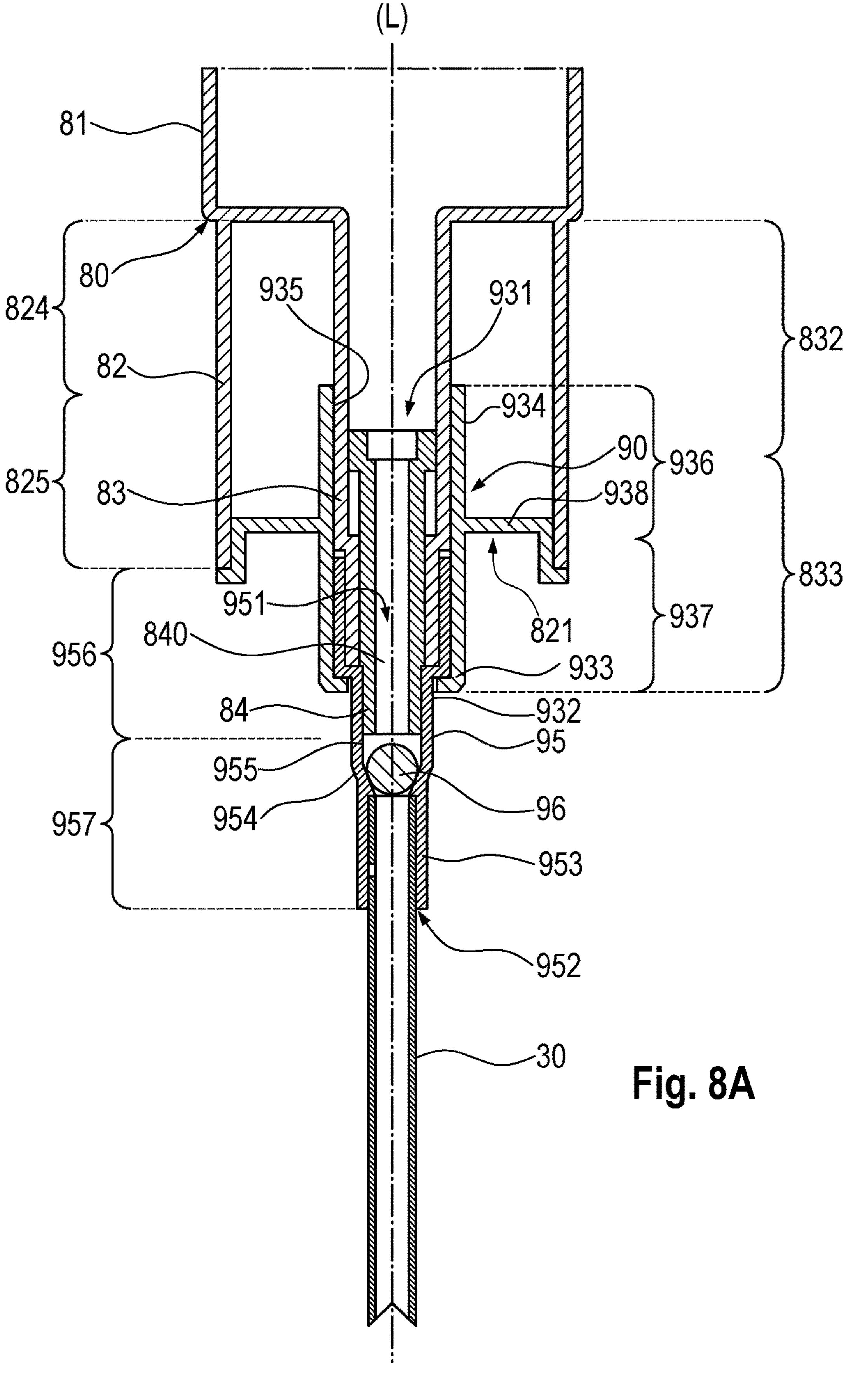
FIG. 8A provides an enlarged view of an area of FIG. 8 including a sealing cap of a dual chamber pump, according to one or more aspects.
Figure 9:
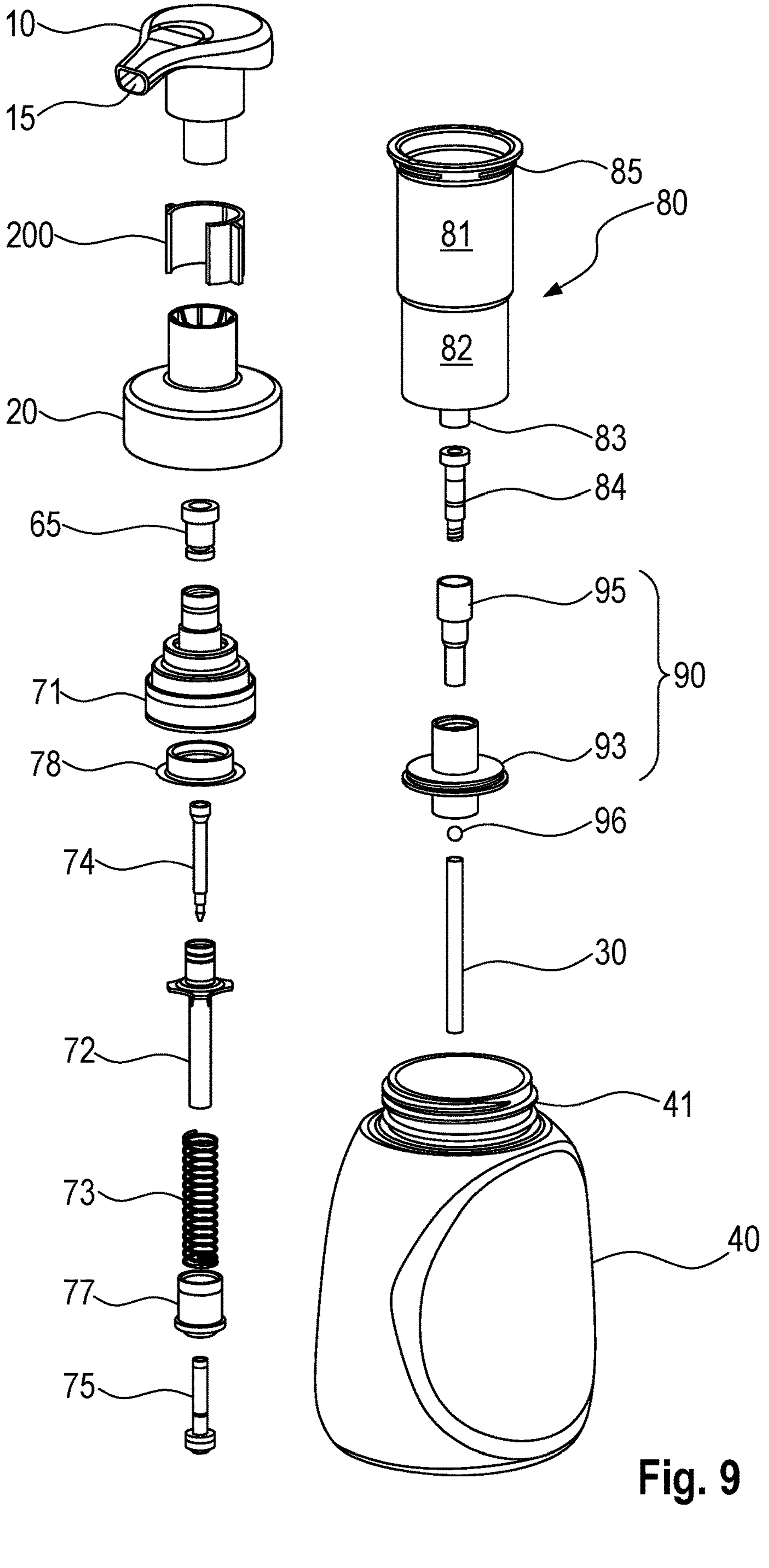
FIG. 9 provides an exploded view of the pump dispenser including the dual chamber pump of FIG. 7 in disassembled form, according to one or more aspects.

FIG. 7 provides a front perspective view of an alternative dual chamber pump 60 including a sealing cap 90 that has two pieces. The same housing 80 as shown in a FIG. 4 is used in that aspect. FIG. 8 provides a cross-sectional view of the dual chamber pump 60 of FIG. 7. FIG. 8A provides an enlarged view of an area of FIG. 8 including a two pieces type sealing cap 90 of a dual chamber pump 60. FIG. 9 provides an exploded view of the pump dispenser 1 including the dual chamber pump 60 of FIG. 7 in disassembled form.

As shown in FIG. 7, the dual chamber pump 60 includes a piston assembly 70; a housing 80; and an alternative sealing cap 90. The housing 80 of the dual chamber pump 60 includes a pump chamber 81 and a storage chamber 82. The sealing cap 90 is connected to the dip tube 30. As described more in details below, the dual chamber pump 60 may further comprise a mesh 65.

As shown in FIG. 8 and in FIG. 8A, the sealing cap 90 of the dual chamber pump 60 has two pieces and comprises an upper cap 93 and a sub-stem 95. The upper cap 93 of the sealing cap 90 seals the lower portion 825 of the storage chamber 82. Also, the upper cap 93 of the sealing cap 90 wraps a portion of the lower portion 833 of the core 83. The sealing of the storage chamber 82 is secured accordingly.

As shown in FIG. 8A, the sealing cap 90 comprises an upper cap 93 and a sub-stem 95. The upper cap 93 of the sealing cap 90 may be a sleeve having an open top 931 and an open bottom 932. The upper cap 93 may have a side wall 933 having an outer surface 934 and an inner surface 935. The sealing cap 90 may have a upper portion 936 and a lower portion 937. The upper portion 936 and the lower portion 937 of the upper cap 93 may be separated by an annular ring 938. The annular ring 938 of the upper cap 93 may protrude from the outer surface 934 of the side wall 933 of the upper cap 93. The upper cap 93 forms a central opening coaxial to the longitudinal axis L.

The upper portion 936 of the upper cap 93 may have a diameter greater than a diameter of the lower portion 937 of the upper cap 93.

The sub-stem 95 of the sealing cap 90 may be a sleeve having an open top 951 and an open bottom 952. The sub-stem 95 may have a side wall 953 having an outer surface 954 and an inner surface 955. The sub-stem 95 may have a upper portion 956 and a lower portion 957. The sub-stem 95 forms a central opening coaxial to the longitudinal axis L.

The sub-stem 95 may be rigidly connected to the core 83 at or adjacent to the lower portion 825 of the storage chamber 82. Preferably, the sub-stem 95 may be rigidly connected to a portion of the lower portion 833 of the core 83.

The dip tube 30 may be rigidly connected to the sub-stem 95. The dip tube 30 is connected to the lower portion 957 of the sub-stem 95 at the open bottom 952 of the sub-stem 95.

The upper cap 93 may wrap a portion of the core 83 and a portion of the sub-stem 95. Especially, the upper cap 93 may wrap a portion of the lower portion 833 of the core 83 and a portion of the upper portion 956 of the sub-stem 95.

The sub-stem 95 may wrap a portion of the connecting stem 84 and a portion of the core 83. Especially, the sub-stem 95 may wrap a portion of the lower portion 833 of the core 83 and a portion of the lower portion of the connecting stem 84.

The upper cap 93 of the sealing cap 90 may also be rigidly connected to the core 83 at or adjacent to the lower portion 825 of the storage chamber 82. In that case, the upper portion 936 of the upper cap 93 is engaged with the lower portion 833 of the core 83 such that the annular ring 938 of the upper cap 93 closes the open bottom 821 of the storage chamber 82.

In that aspect, the substance S contained in the storage chamber 82 can be kept separate from the formulation F contained in the bottle 40. Hence, the stability of the formulation F and/or the substance S can be ensured. The product ingredients contained in the substance S or the formulation F can have an extended shelf life and contribute for enhancing product effectiveness.

FIG. 9 shows how the different components of the pump dispenser can be inserted and connected together. The connecting stem 84 is introduced in the core 83. The piston assembly 70 as described more in details below is inserted in the pump chamber 81. Beforehand the piston assembly 70 is mounted. For this, a spring 73 is positioned in a spring seat 77. A pull stick 74 within a piston rod 72 is introduced within the spring 73. A piston tip 75 is inserted in an open bottom of the piston rod 72 to close the open bottom of the piston rod 72 and an open bottom of the spring seat 77. An open top of the piston rod 72 is connected to the piston skirt 71 and a diaphragm 78. A mesh 65 is connected to the piston skirt 71. Then, the dual chamber pump 60 is connected to a closure 20. An actuator 10 having an outlet 15 is inserted in the closure 20, optionally with a clip 200.

Then, the dip tube 30 is connected at the open bottom 952 of the sub-stem 95. An inlet one-way valve 96 is introduced from the open top 951 of the sub-stem 95. The sub-stem 95 is introduced in the upper cap 93 of the sealing cap 90 from the open top 931 of the upper cap 93.

The substance S is added in the storage chamber 82 from the open bottom 821 of the storage chamber 82. The sealing cap 90 by the upper cap 93 of the sealing cap 90 closes the lower portion 825 of the storage chamber 82 after the substance S has been added to the storage chamber 82. The sealing cap 90 by the sub-stem 95 also closes an open bottom of the connecting stem 84 within the core 83.

The resulting pump assembly 50 is then inserted and engaged, e.g. threadingly screwed, with a bottle 40 containing the formulation F.

Inlet One-Way Valve

The dual chamber pump 60 may include an inlet one-way valve 96 such that the inlet one-way valve 96 permits fluid flow in a downstream direction from the bottle 40 or the dip tube 30 towards the pump chamber 81 and the actuator 10 to prevent fluid flow in a upstream direction.

In some examples, the inlet one-way valve 96 may be positioned between the connecting stem 84 and the dip tube 30 within the sealing cap 90. In that case, the sealing cap 90 is one single piece.

Alternatively, when the sealing cap 90 comprises an upper cap 93 and a sub-stem 95, the inlet one-way valve 96 may be positioned between the connecting stem 84 and the dip tube 30 within the sub-stem 95 of the sealing cap 90.

The inlet one-way valve 96 may be typically selected from the group consisting of a free-floating ball check valve, a spring-loaded ball check valve, a diaphragm check valve, a swing check valve, a flapper valve, a clapper valve, a backwater valve, a lift check valve, an in-line check valve, an umbrella valve, and a duckbill valve.

Piston Assembly

The dual chamber pump 60 comprises a piston assembly 70, wherein the piston assembly 70 is in fluid communication with the actuator 10.

The piston assembly 70 may comprise a piston skirt 71; a piston rod 72 engaged with the piston skirt 71, namely attached to the piston skirt 71; and a spring 73.

In that aspect, the piston skirt 71 seals the upper portion 815 of the pump chamber 81. The piston rod 72 has a hollow inner cavity 720. The hollow inner cavity 720 of the piston rod 72 may be in fluid communication with the actuator 10. The hollow inner cavity 720 of the piston rod 72 has an upper portion 721 and a lower portion 722.

The upper portion 721 of the hollow inner cavity 720 of the piston rod 72 includes a pull stick 74. The lower portion 722 of the hollow inner cavity 720 of the piston rod 72 includes a piston tip 75. The piston tip 75 may have a hollow inner cavity 750 in fluid communication with the hollow inner cavity 720 of the piston rod 72 and the core 83.

The pull stick 74 may be engaged with the piston tip 75. The piston tip 75 is slidably engaged with the core 83 and the piston tip 75 is configured to move relative to the pull stick 74.

When the actuator 10 is pushed down for a first time by a user, the piston assembly 70 moves to push down the connecting stem 84 by direct contact between the piston tip 75 and the connecting stem 84.

When the sealing cap 90 is a single piece, the sealing cap 90 moves along the core 83 along the longitudinal axis L together with the connecting stem 84.

When the sealing cap 90 comprises the upper cap 93 and the sub-stem 95, the upper cap 93 and the sub-stem 95 of the sealing cap 90 move along the core 83 along the longitudinal axis L together with the connecting stem 84.

In both cases, the sealing cap 90 does not fall into the bottle 40 when the storage chamber 82 has been open after the actuator 10 has been pushed or "primed" for the first time by the user.

In operation, the final composition FC as a liquid or gel is drawn from the bottle 40 to which the manually operated pump assembly 50 is in fluid communication with, for example via the dip tube 30. The liquid or gel passes through the inlet one-way valve 96 into the dual chamber pump 60 of the pump assembly 50 towards the actuator 10. Specifically, the liquid or gel passes through the inlet one-way valve 96 into the connecting stem 84, the core 83, the hollow inner cavity 750 of the piston tip 75, the hollow inner cavity 720 of the piston rod 72 and then the actuator 10.

The inlet one-way valve 96 permits flow in the downstream direction from the bottle 40 or dip tube 30 to the dual chamber pump 60 and prevents flow in the upstream direction. The dual chamber pump 60 of the pump assembly 50 is downstream of and in fluid communication with the inlet one-way valve 96 with the connecting stem 84.

The piston assembly 70 is interior to the housing 80 of the dual chamber pump 60 and is slidably engaged with the housing 80, preferably with the pump chamber 81 and the core 83.

The piston assembly 70 and the housing 80 may be moveable relative to each other. In some examples, the piston assembly 70 and the core 83 of the housing 80 may be moveable relative to each other. The piston assembly 70 may be moveable within a stationary housing 80, which is a practical approach.

The piston assembly 70 may be interior to the pump chamber 81 of the housing 80. Alternatively, the piston assembly 70 may be interior to the pump chamber 81 of the housing 80 and at least partially engaged with the core 83.

The actuator 10 is engaged with the piston assembly 70 or the housing 80 of the dual chamber pump 60, depending of the mechanism for providing movement of the piston assembly 70 and housing 80 relative to one another. The actuator 10 may be pressed to actuate movement of the piston assembly 70 and housing 80 relative to one another. In a reasonably practical arrangement, the actuator 10 is engaged with the piston assembly 70 to drive movement of the piston assembly 70 within a stationary housing 80. That is the piston assembly 70 may move relative to a stationary housing 80, specifically a stationary pump chamber 81 and stationary core 83.

The dual chamber pump 60 may further comprise a mesh 65 having an upper end 651 and a lower end 652, wherein the actuator 10 is adapted to receive the upper end 651 of a mesh 65, wherein the upper end 651 of the mesh 65 is rigidly connected to the actuator 10, wherein the mesh 65 is in fluid communication with the actuator 10.

In that aspect, the piston assembly 70 may be in fluid communication with the mesh 65, wherein the piston skirt 71 holds and connects the mesh 65 to the piston rod 72 of the piston assembly 70.

The final composition FC as a liquid or gel discharged from the dual chamber pump 60 is discharged through an actuator outlet 15.

The piston assembly 70 may conform to the inner surface 814 of the pump chamber 81. The piston skirt 71 may be positioned between the piston rod 72 and the inner surface 814 of the pump chamber 81 to provide a seal between the piston rod 72 and the pump chamber 81. The piston skirt 71 seals the upper portion 815 of the pump chamber 81. The piston rod 72 may be attached to the piston skirt 71.

The pump chamber 81 of the dual chamber pump 60 may comprise one or more air venting holes 810. The one or more air venting holes 810 of the pump chamber 81 may be located at or adjacent of the upper portion 815 of the pump chamber 81.

Figure 10:
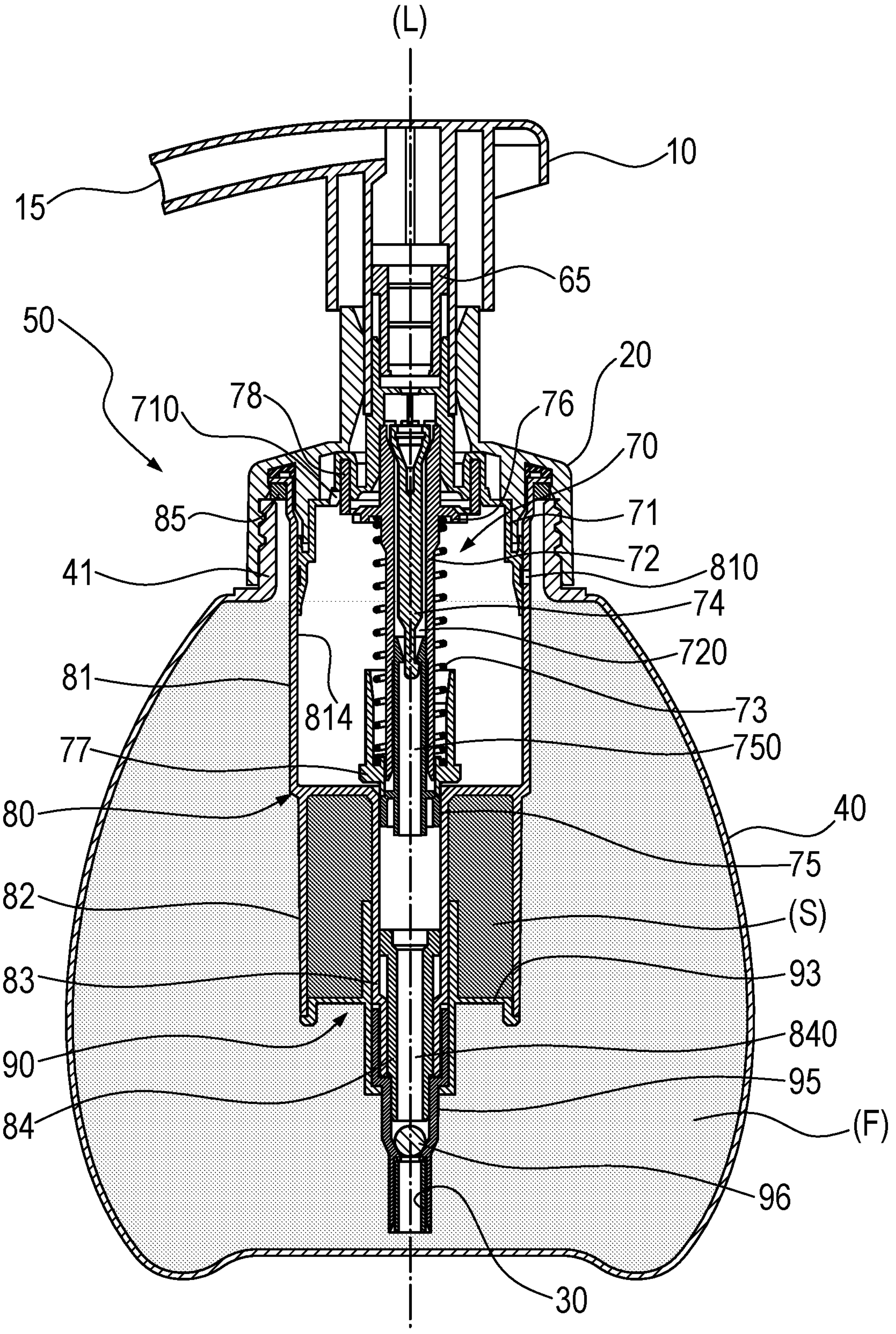
FIG. 10 provides a cross-sectional view of a pump dispenser including a pump assembly having a dual chamber pump, wherein a storage chamber of the dual chamber pump comprises a substance to be released in a formulation contained in the bottle prior use.

The pump chamber 81 may comprise one or more air venting holes 810 located at the inner surface 814 of the pump chamber 81, preferably located at the inner surface 814 of the pump chamber 81 between the piston skirt 71 and the closure 20, see for instance FIG. 10.

When the bottle 40 is closed by the pump assembly 50, the one or more air venting holes 810 of the pump chamber 81 may be located adjacent the neck 41 of the bottle 40 and distal from the formulation F or final composition FC (liquid or gel) contained in the bottle 40.

During pressing of the actuator 10 by the user, air is pressed out of pump chamber 81. Pressure developed in the liquid or gel within the pump chamber 81 may drive liquid or gel towards the actuator outlet 15.

The piston skirt 71 of the piston assembly 70 may comprise one or more air venting holes 710, as shown for instance in a FIG. 5, FIG. 8 or FIG. 10. The one or more air venting holes 710 of the piston skirt 71 may be located at or adjacent of the upper portion 815 of the pump chamber 81, preferably distal from the closure 20 and the piston rod 72.

When the actuator 10 is released, the piston assembly 70 returns to its resting position, air will enter in the pump chamber 81 via the one or more air venting holes 710 of the piston skirt 71 to store air for the next pumping action of the actuator 10.

Also, air may enter into the bottle 40 via air venting holes 810 of the pump chamber 81 to compensate space lost by dispensed liquid or gel. Hence, the bottle 40 can maintain a rigid shape without the need of increasing a pressing force.

The dual chamber pump 60 may comprise an outer gasket 85. The outer gasket 85 may be friction fitted to the outside of the upper portion 815 of the pump chamber 81. The outer gasket 85 may act as a gasket barrier on a bottle land area to prevent product leakage. The outer gasket 85 may be made from a wide variety of materials such as but not limited to: rubber, low density polyethylene (LDPE), and the like.

The piston skirt 71 of the piston assembly 70 may be engaged with a diaphragm 78.

The piston assembly 70 may comprise a spring 73. The pump chamber 81 may include a spring seat 77 located at the lower portion 816 of the pump chamber 81 or adjacent and spaced to the lower portion 816 of the pump chamber 81.

The spring 73 of the piston assembly 70 at least partially surrounds the piston rod 72 from a spring stop 76 at the piston skirt 71, or adjacent and spaced to the piston skirt 71 to a bottom of the spring seat 77 at the lower portion 816 of the pump chamber 81 or adjacent and spaced to the lower portion 816 of the pump chamber 81.

As shown for instance in a FIG. 5 or FIG. 8, the spring 73 of the piston assembly 70 surrounds the piston rod 72 from the spring stop 76 at the piston skirt 71, to the bottom of the spring seat 77 at the lower portion 816 of the pump chamber 81.

In that aspect, the spring 73 of the piston assembly 70 is not in contact or in fluid communication with the liquid or gel contained in the bottle 40 when the actuator is pressed down after being "primed" (after the first actuation). The spring 73 of the piston assembly 70 is positioned externally to the piston rod 72.

Alternatively, the spring 73 of the piston assembly 70 may be located within the hollow inner cavity 720 of the piston rod 72, wherein the spring 73 at least partially surrounds the pull stick 74 and the piston tip 75.

Figure 15:
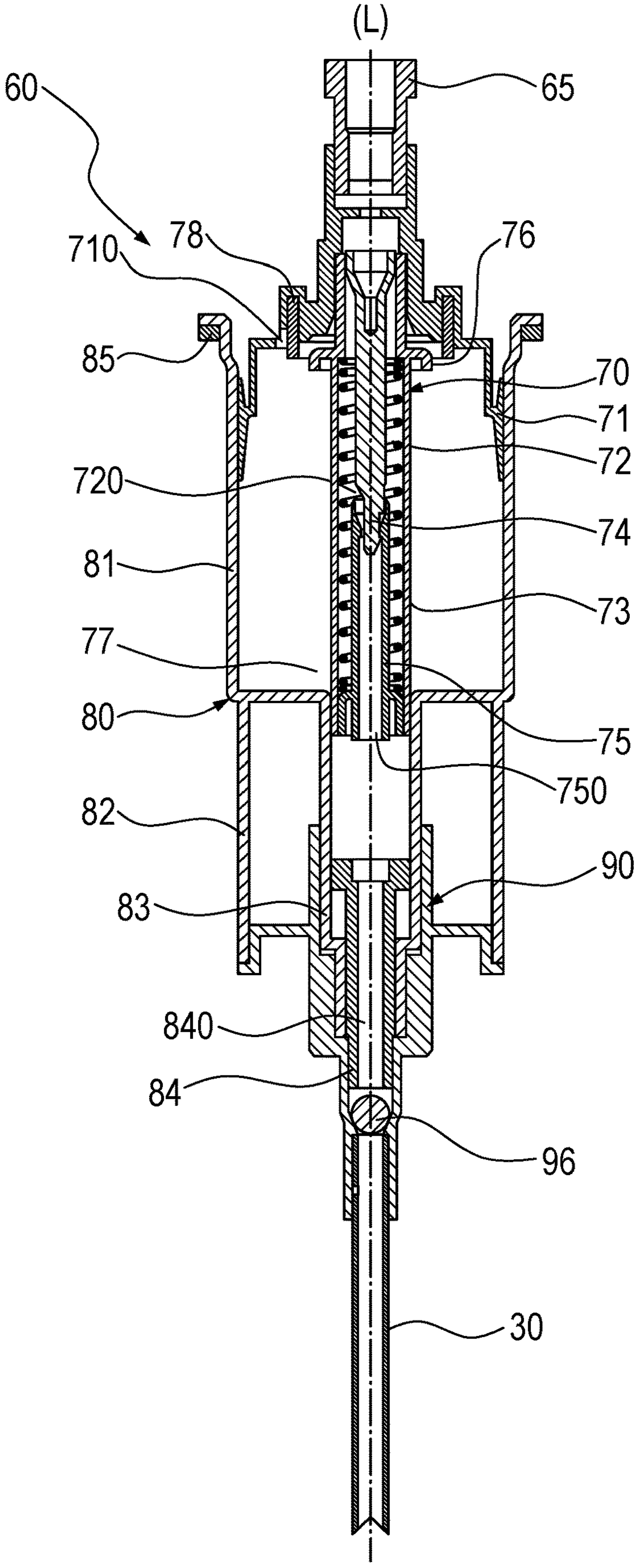
FIG. 15 provides a cross-sectional view of another dual chamber pump, wherein a spring is located within a hollow inner cavity of a piston rod and at least partially surrounds a pull stick and a piston tip of a piston assembly according to one or more aspects.

FIG. 15 provides a cross-sectional view of another dual chamber pump 60, wherein a spring 73 is located within a hollow inner cavity 720 of a piston rod 72 and at least partially surrounds a pull stick 74 and a piston tip 75 of a piston assembly 70.

In that aspect, the spring 73 of the piston assembly 70 may be in contact or in fluid communication with the liquid or gel contained in the bottle 40 when the actuator is pressed down after being "primed" (after the first actuation). The spring 73 of the piston assembly 70 is positioned internally to the piston rod 72.

In all aspects, the spring 73 may comprise a design selected from the group consisting of single helix, double helix, stacked double helix, wave spring, and combinations thereof.

Actuation

FIG. 10-13 provide successive cross-sectional views of a pump dispenser 1 including a pump assembly 50 and a dual chamber pump 60 to show how the substance S contained in the storage chamber 82 of the dual chamber pump 60 is released in the bottle 40 containing a formulation F to form and to dispense the resulting final composition FC. The final composition FC may be in a form of a liquid or gel.

As explained hereinbefore, the substance S is firstly contained in the storage chamber 82 and kept separate from the formulation F contained in the bottle 40 as shown in a FIG. 10. The pump dispenser 1 is in a locked storage configuration, which is prior to first actuation and use.

Figure 11:
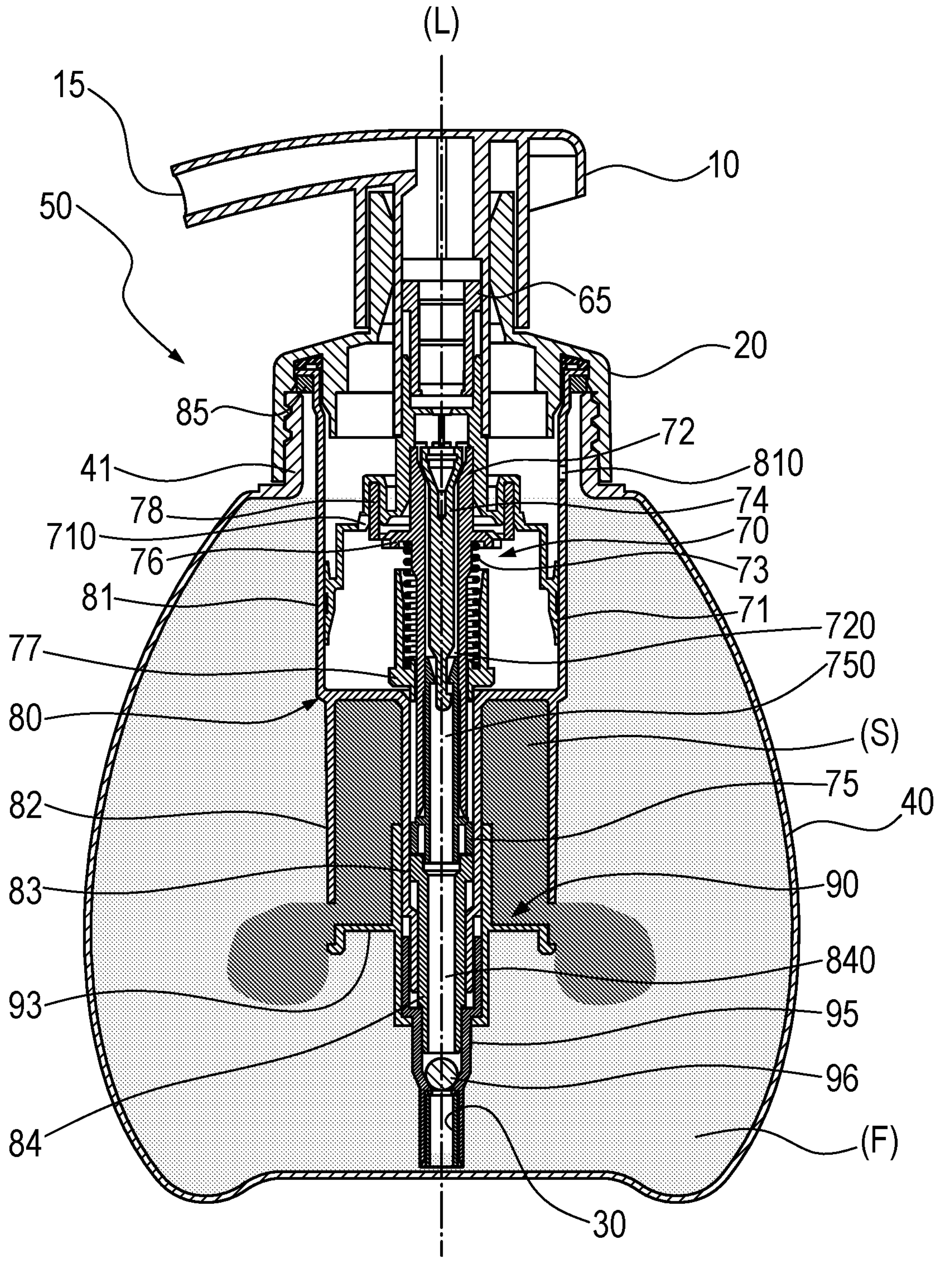
FIG. 11 provides a cross-sectional view of the pump dispenser of FIG. 10, wherein an actuator is pushed down for a first time by a user to release the substance in the formulation contained in the bottle.

FIG. 11 is a cross-sectional view of the pump dispenser 1 of FIG. 10 during the first actuation or when the pump assembly has been "primed". When the actuator 10 is pushed down for a first time by a user, the piston assembly 70 moves to push down the connecting stem 84. The piston skirt 71 and the piston rod 72 are pushed down and compressed the spring 73 such that the piston tip 75 bumps into the connecting stem 84. The resulting linear movement of the connecting stem 84 along the longitudinal axis L pushes down the single piece sealing cap 90 to open the storage chamber 82 for releasing the substance S contained in the storage chamber 82 in the bottle 40. The single piece sealing cap 90 remains engaged with the core 83 such that the sealing cap 90 does not fall into the bottle 40.

Alternatively, the resulting linear movement of the connecting stem 84 along the longitudinal axis L pushes down both the upper cap 93 and the sub-stem 95 of the sealing cap 90 as shown in FIG. 11 to open the storage chamber 82 for releasing the substance S contained in the storage chamber 82 in the bottle 40. The upper cap 93 and the sub-stem 95 of the sealing cap 90 remain engaged with the core 83 such that the sealing cap 90 does not fall into the bottle 40 as shown in FIG. 11.

In all aspects, the connecting stem 84 is within a travel distance of the spring seat 77 along the longitudinal axis L, which is the same travel distance between the spring stop 76 and the top of the spring seat 77 along the longitudinal axis L.

The connecting stem 84 may be within a travel distance of the spring seat 77 along the longitudinal axis L from 12 mm to 25 mm, alternatively from 13 mm to 23 mm, alternatively from 15 mm to 20 mm, and alternatively from 15.5 mm to 18.5 mm.

The connecting stem 84 and the sealing cap 90 may move downwards at a distance along the longitudinal axis L of the dual chamber pump 60 from 1 mm to 10 mm, alternatively from 1.5 mm to 7.5 mm, alternatively from 2.5 mm to 5.5 mm, and alternatively from 5.0 mm to 5.5 mm.

For this, the piston rod 72 compresses the spring 73 until the spring stop 76 bumps into a top of the spring seat 77; alternatively until the spring 73 is fully compressed. The piston tip 75 moves linearly towards the connecting stem 84. Then, the connecting stem 84 and the sealing cap 90 move downwards at the distance along the longitudinal axis L of the dual chamber pump 60 from 1 mm to 10 mm, alternatively from 1.5 mm to 7.5 mm, alternatively from 2.5 mm to 5.5 mm, and alternatively from 5.0 mm to 5.5 mm.

Figure 12:
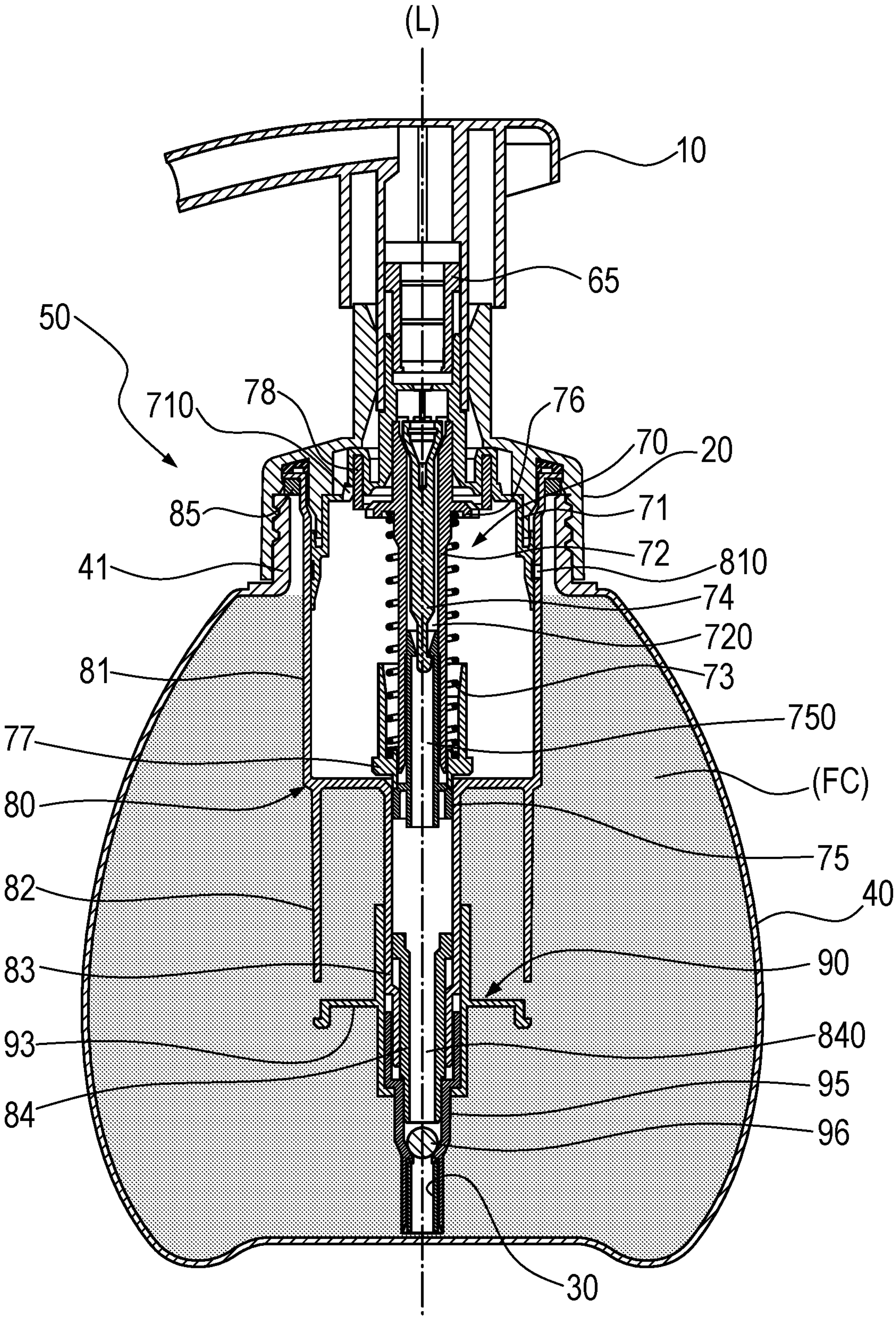
FIG. 12 provides a cross-sectional view of the pump dispenser of FIG. 11 after shaking the bottle to mix the substance and the formulation to obtain a final composition.

As shown in a FIG. 12, after the substance S is released in the bottle 40 containing the formulation F, a final composition FC is obtained, after shaking the bottle 40 for instance. The storage chamber 82 remains open, however, the sealing cap 90 do not fall into the bottle 40 and remain engaged with the core 83.

After first actuation, the connecting stem 84 is out of spring seat 77's travel distance. When the spring 73 is compressed, the spring 73 will not trigger the movement of the connecting stem 84 and the pump assembly 50 will function as a typical pump assembly.

Figure 13:
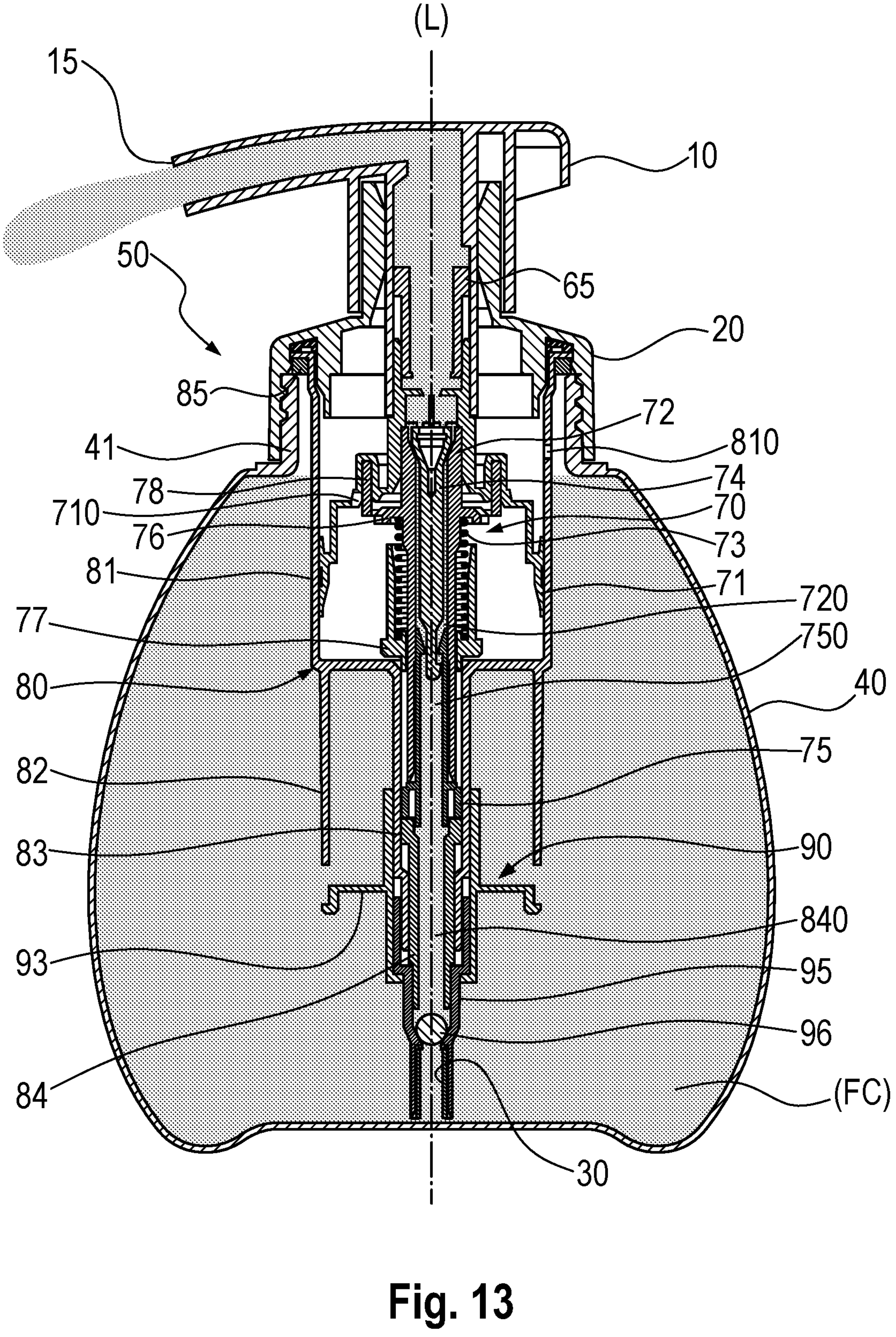
FIG. 13 provides a cross-sectional view of the pump dispenser of FIG. 12 when the user continues pushing down the actuator to dispense the resulting final composition.

As shown in a FIG. 13, when the user continues actuation, the resulting final composition FC can be drawn from the bottle 40 via the dip tube 30. The final composition FC passes through the inlet one-way valve 96 into the dual chamber pump 60 of the pump assembly 50 towards the actuator 10. Specifically, the final composition FC passes through the inlet one-way valve 96 into the connecting stem 84, the core 83, the hollow inner cavity 750 of the piston tip 75, the hollow inner cavity 720 of the piston rod 72 and then the actuator 10.

The inlet one way-valve 96 permits flow in the downstream direction from the bottle 40 or dip tube 30 to the dual chamber pump 60 and prevents flow in the upstream direction. The dual chamber pump 60 of the pump assembly 50 is downstream of and in fluid communication with the inlet one-way valve 96 with the connecting stem 84.

Exemplary Packaging Materials

A variety of thermoplastic materials or rigid and semi-rigid materials may be used for the pump dispenser 1, the bottle 40 and the pump assembly 50, and other components of the pump dispenser 1 herein. For example, rigid and semi-rigid materials may include, but are not limited to, metals, including but not limited to, aluminum, magnesium alloy, steel; glass; including but not limited to, laminates and polymeric materials such as polypropylene (PP), polyethylene (PE), polystyrene (PS), polyethylene-terephthalate (PET), styrene-acrylonitrile copolymer (SAN), polyethylene-terephthalate copolymers, polycarbonate (PC), polyamides, acrylonitrile-butadiene-styrene (ABS), thermoplastic elastomers, polyoxymethylene copolymer and mixtures thereof.

Any of the aforementioned polyolefins could be sourced from bio-based feedstocks, such as sugarcane or other agricultural products, to produce a bio-polypropylene or bio-polyethylene.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically modified starch and polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials. For example, the blend may be a combination of materials derived from virgin bio-derived or petroleum-derived materials, or recycled materials of bio-derived or petroleum-derived materials. One or more of the thermoplastic materials in a blend may be biodegradable. Thermoplastic materials may be biodegradable.

The thermoplastic material may also be, for example, a polyester. Exemplary polyesters include, but are not limited to, polyethylene terephthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly (acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material may also be a blend of multiple polymeric and non-polymeric materials. The thermoplastic material may be, for example, a blend of high, medium, and low molecular polymers yielding a multi-modal or bi-modal blend. The multi-modal material may be designed in a way that results in a thermoplastic material that has superior flow properties yet has satisfactory chemo/physical properties. The thermoplastic material may also be a blend of a polymer with one or more small molecule additives. The small molecule could be, for example, a siloxane or other lubricating molecule that, when added to the thermoplastic material, improves the flowability of the polymeric material.

Polymeric materials may also include various fillers known to the skilled artisan, such as, for example, mica, interference pigments, wood flour; or materials that are capable of "blooming" to the surface of a molded component. Other additives may include inorganic fillers such calcium carbonate, calcium sulfate, talcs, clays (e.g., nanoclays), aluminum hydroxide, calcium silicate ($CaSiO_3$), glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

The pump dispenser 1, the bottle 40 and the pump assembly 50, and other components of the pump dispenser 1 herein may be disposable and recyclable. The pump dispenser 1 may be made of a sustainable material selected from the group consisting of a recycled material and a renewable material.

Examples of renewable materials include bio-polyethylene, bio-polyethylene terephthalate, and bio-polypropylene. As used herein and unless otherwise noted, "polyethylene" encompasses high density polyethylene (HDPE), low density polyethylene (LDPE), linear low density polyethylene (LLDPE), and ultra-low density polyethylene (ULDPE). As used herein and unless otherwise noted, "polypropylene" encompasses homopolymer polypropylene, random copolymer polypropylene, and block copolymer polypropylene.

As used herein, "recycled" materials encompass post-consumer recycled (PCR) materials, post-industrial recycled (PIR) materials, and a mixture thereof. The pump dispenser 1 or pump assembly 50 may be composed of recycled high density polyethylene, recycled polyethylene terephthalate, recycled polypropylene, recycled LLDPE, or recycled LDPE, in some examples recycled high density polyethylene, recycled polyethylene terephthalate, or recycled polypropylene, and in other examples recycled high density polyethylene or recycled polyethylene terephthalate.

The sustainable material may contain one or more bio-derived polymers or plastics selected from the group consisting of bio-derived polyethylene, bioderived high-density polyethylene, bio-derived polypropylene, bio-derived polyethylene terephthalate, and mixtures thereof, see for instance CA2762589A1, which is incorporated herein by reference.

However, the pump dispenser 1 or pump assembly 50 may be substantially free, or free of a plastic polymeric material selected from the group consisting of polyethylene, polypropylene, polyethylene terephthalate, polyester, polyamide, polystyrene, polyvinyl chloride, and mixtures thereof.

Substance, Formulation and Final Composition

Substance

The substance S that need to be separate from the formulation F until use may contain sensitive ingredients, a hair color to be separated from an oxidation agent, an active ingredient such as an anti-dandruff agent, a benefit agent such as silicone compounds, perfumes, incompatible agents with the ingredients of the formulation F, and the like.

The substance S may be selected from the group consisting of an amino acid surfactant, a perfume, a capsulated perfume, a perfume capsulated in β-cyclodextrin, an anti-microbial active, a probiotic material, a preservative material, a benefit phase, and mixtures thereof.

Sensitive ingredients may be ingredients prone to oxidation such as piroctone olamine, vitamin C, or provitamins.

Suitable benefit agents may include perfumes, brighteners, insect repellants, silicones, waxes, flavors, vitamins, fabric softening agents, skin care agents, enzymes, perfume delivery system; conditioning agents, moisturizers, anti-bacterial agents, anti-microbial agents, thickeners, sensates, attractants, dyes, pigments, bleaches and mixtures thereof.

The benefit agent may alternatively comprise perfumes such as vanillin or ketones or aldehydes, brighteners, enzymes, perfume delivery system such as encapsulated perfumes with β-cyclodextrin; conditioning agents, moisturizers, anti-microbial agents, thickeners, sensates, attractants, dyes, pigments, bleaches and mixtures thereof.

Benefit agents may be particles and non-soluble materials that are not be easily suspended in the formulation, e.g., metal oxide; botanic extracts, oils.

The benefit agent may be selected from the group consisting of petrolatum; lanolin; derivatives of lanolin; natural waxes; synthetic waxes; volatile organosiloxanes; derivatives of volatile organosiloxanes; non-volatile organosiloxanes; derivatives of non-volatile organosiloxanes; lanolin oil; lanolin esters; natural triglycerides; synthetic triglycerides; and mixtures thereof.

Alternatively, non-limiting examples glycerides suitable for use as hydrophobic skin benefit agents herein include castor oil, soybean oil, derivatized soybean oils such as maleated soybean oil, safflower oil, cotton seed oil, corn oil, walnut oil, peanut oil, olive oil, cod liver oil, almond oil, avocado oil, palm oil and sesame oil, vegetable oils, sunflower seed oil, and vegetable oil derivatives; coconut oil and derivatized coconut oil, cottonseed oil and derivatized cottonseed oil, jojoba oil, cocoa butter, shea butter, and mixtures thereof.

Still other suitable hydrophobic skin benefit agents include wax esters, non-limiting examples of which include beeswax and beeswax derivatives, spermaceti, myristyl myristate, stearyl stearate, and mixtures thereof. Also useful are vegetable waxes such as carnauba and candelilla waxes; sterols such as cholesterol, cholesterol fatty acid esters; and phospholipids such as lecithin and derivatives, sphingo lipids, ceramides, glycosphingo lipids, and mixtures thereof. Also suitable benefit agents include glycerol monooleate.

The substance S may comprise a hydrophobic benefit agent and a lipid bilayer structurant. The lipid bilayer structurant comprises glyceryl monooleate, glyceryl monostearate, glyceryl monolaurate, or a mixture thereof. The benefit agent comprises petrolatum, soybean oil, sucrose polyester, mineral oil, or a mixture thereof.

During the mixing of the substance S and the formulation F, depending on the selected ingredients, form change e.g. foam versus liquid can be obtained.

Also, the substance S may include one or more attractive ingredients e.g. flowers or beads floating in liquid, and the like that can be added to improve the overall impression and experience of the consumer.

Skin benefits agent may be incompatible agent with a surfactant of the formulation F because of a large amount of surfactant Active ingredients, e.g. amines may be incompatible with other ingredients such as perfumes including aldehydes or ketones.

Active ingredients may have additional benefits beyond cleansing benefits. For instance, active ingredients may be skin health or anti-acne ingredients, and the like, e.g. niacinamide, salicylic acid.

Formulation

The formulation F may comprise a surfactant system in a cosmetically acceptable carrier, such as an aqueous carrier. The surfactant system may comprise an anionic surfactant, for example a sulfate-free anionic surfactant, and a co-surfactant. Alternatively, the surfactant system may comprise a cationic surfactant.

The anionic surfactant may be selected from the group consisting of fatty acyl isethionates, fatty acyl sarcosinates, sulfosuccinates, sulfonates, sulfoacetates, acyl glycinates, acyl alaninates, acyl glutamates, lactates, lactylates, glucose carboxylates, amphoacetates, taurates, and mixtures thereof.

The co-surfactant may include an amphoteric surfactant or a zwitterionic surfactant. Suitable amphoteric or zwitterionic surfactants can include those described in U.S. Pat. Nos. 5,104,646 and 5,106,609.

Alternatively, the substance S may include specific surfactants such as fatty acyl sarcosinates or acyl glycinates to be stored in the storage chamber 82.

Final Composition

The final composition FC may be a consumer product, alternatively a cleaning composition to be applied on a surface of interest. The final composition FC may be a liquid or a gel; and may be a personal cleansing composition in a form of a hair shampoo, a hair conditioner composition, a liquid detergent composition, a fabric care composition or a fabric softener, a shower or bath cream, a body wash or foaming body wash, or a liquid hand soap.

The product forms contemplated for purposes of defining the personal cleansing compositions and methods are rinse-off formulations by which it is meant that the product is applied topically to the skin or hair and then subsequently (i.e., within minutes) rinsed away with water, or otherwise wiped off using a substrate or other suitable removal means.

Alternatively, the final composition FC may be a leave-on product like, for example, a hand sanitizer, a facial moisturizer, or a body lotion.

The final composition FC may be alternatively a body lotion. The body lotion typically has an aqueous and oily phases, an emulsifier to prevent separation of the two aqueous and oily phases, and a benefit agent. A suitable benefit agent may be niacinamide.

Alternatively, the final composition FC may be a personal cleansing composition, wherein the personal cleansing composition is selected from the group consisting of a liquid hand washing composition, a liquid body washing composition, a liquid hair washing composition, and combinations thereof.

The personal cleansing composition such as a body wash, a hand liquid soap or a hair shampoo may comprise a surfactant system as set out above, and a benefit agent. For a body wash, a benefit agent may be petrolatum, mineral oil or a vegetable oil, e.g. soybean oil to provide moisturization onto skin.

Alternatively, the final composition may be a hair shampoo, wherein the hair shampoo comprises a cationic polymer such a cationic guar polymer, conditioning agents (including hydrocarbon oils, fatty esters, silicones), anti-dandruff actives, and chelating agents. Additional suitable optional ingredients include but are not limited to particles, anti-microbials, foam boosters, anti-static agents, moisturizing agents, propellants, self-foaming agents, pearlescent agents, opacifiers, sensates, suspending agents, solvents, diluents, anti-oxidants, vitamins, and mixtures thereof.

Conditioning agents (including hydrocarbon oils, fatty esters, silicones), anti-dandruff actives, or sensitive ingredients may be the substance S.

The cationic polymer may be selected from the group consisting of Polyquaternium-6, Polyquaternium-10, cationic guars, and mixtures thereof.

Alternatively, the final composition FC may be a hair conditioner composition, wherein the hair conditioner composition comprises:

(a) a cationic surfactant, a high melting point fatty compound; a silicone compound; and (b) a carrier.

Alternatively, the substance S may include the silicone compound to be stored in the storage chamber 82.

Cationic surfactants may be those having a longer alkyl group, i.e., $C_{18}$-$C_{22}$ alkyl group, for example, behenyl trimethyl ammonium chloride, methyl sulfate or ethyl sulfate, and stearyl trimethyl ammonium chloride, methyl sulfate or ethyl sulfate.

Alternatively, cationic surfactants may be tertiary amidoamines having an alkyl group of from 12 to 22 carbon atoms, alternatively from 16 to 22 carbon atoms. Exemplary tertiary amido amines include: stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylamine, behenamidoethyldiethylamine, behenamidoethyldimethylamine, arachidamidopropyldimethylamine, arachidamidopropyldiethylamine, arachidamidoethyldiethylamine, arachidamidoethyldimethylamine, diethylaminoethylstearamide. Useful amines are disclosed in U.S. Pat. No. 4,275,055, Nachtigal, et al.

Alternatively, cationic surfactants may include di-alkyl cationic surfactants, for example, dialkyl (14-18) dimethyl ammonium chloride, ditallow alkyl dimethyl ammonium chloride, dihydrogenated tallow alkyl dimethyl ammonium chloride, distearyl dimethyl ammonium chloride, ordicetyl dimethyl ammonium chloride.

The high melting point fatty compound as used herein is a fatty compound having a melting point of 25° C. or higher, alternatively 40° C. or higher, and alternatively 50° C. or higher. The high melting point fatty compound may be selected from the group consisting of fatty alcohols, fatty acids, fatty alcohol derivatives, fatty acid derivatives, and mixtures thereof.

Typical fatty alcohols may be selected from the group consisting of pure cetyl alcohol, stearyl alcohol, behenyl alcohol, and mixtures thereof.

Silicone compounds useful herein may also include amino substituted materials. Preferred aminosilicones may include, for example, those which conform to the general formula (I):

$$(R_1)_aG_{3-a}\text{-Si—(—OSiG}_2)_n\text{-(—OSiGe}(R_1)_{2-b})_m\text{—O—}SiG_{3-a}(R_1)_a$$

wherein G is hydrogen, phenyl, hydroxy, or $C_1$-$C_8$ alkyl, preferably methyl; a is 0 or an integer having a value from 1 to 3, preferably 1; b is 0, 1 or 2, preferably 1; n is a number from 0 to 1,999; m is an integer from 0 to 1,999; the sum of n and m is a number from 1 to 2,000; a and m are not both 0; $R_1$ is a monovalent radical conforming to the general formula $CqH_{2q}L$, wherein q is an integer having a value from 2 to 8 and L is selected from the following groups: $—N(R_2)CH_2—CH_2—N(R_2)_2$; $—N(R_2)_2$; $—N(R_2)_3A^-$; $—N(R_2)CH_2—CH_2—NR_2H_2A^-$; wherein $R_2$ is hydrogen, phenyl, benzyl, or a saturated hydrocarbon radical, preferably an alkyl radical from $C_1$ to $C_{20}$; $A^-$ is a halide ion.

Alternatively, the final composition FC may be a liquid detergent composition, wherein the liquid detergent composition comprises a surfactant system as set out above and comprise at least one active selected from the group consisting of: amphiphilic alkoxylated polyalkyleneimine, cyclic polyamine or oligoamine, salt, hydrotrope, organic solvent, and mixtures thereof.

The liquid detergent composition may include probiotics or clean biotics as the substance S. Such ingredients prefer to be separate from the formulation F.

Methods

A method of releasing a substance S in a formulation F contained in a bottle 40 of a pump dispenser 1 as disclosed hereinbefore is provided and comprises the following steps, preferably in that order:

a) filling a substance S to be released in a storage chamber 82 of a dual chamber pump 60 of a pump assembly 50 as disclosed herein;
b) closing the storage chamber 82 with a sealing cap 90;
c) securing a closure 20 of the pump assembly 50 to the bottle 40 to provide the pump dispenser 1;
d) triggering an actuator 10 of the pump assembly 50 which triggers by sequence a piston assembly 70 of the dual chamber pump 60, a connecting stem 84 and the sealing cap 90 of the dual chamber pump 60, such that when the actuator 10 is pushed down for a first time by a user, the piston assembly 70 moves to push down the connecting stem 84, which pushes down the sealing cap 90 to open the storage chamber 82 for releasing the substance S contained in the storage chamber 82;
e) shaking the bottle 40 to mix the substance S with the formulation F contained in the bottle 40 to form a final composition FC; and
f) triggering the actuator 10 to dispense the final composition FC from an actuator outlet 15.

The method of releasing a substance S in a formulation F contained in a bottle 40 of a pump dispenser 1 as disclosed hereinbefore may further specify that in step d), the sealing cap 90 remains engaged with the core 83 and do not fall in the bottle 40.

Alternatively, a method of releasing a substance S in a formulation F contained in a bottle 40 of a pump dispenser 1 as disclosed hereinbefore is provided and comprises the following steps, preferably in that order:

a) filling a substance S to be released in a storage chamber 82 of a dual chamber pump 60 of a pump assembly 50;
b) closing the storage chamber 82 with a sealing cap 90 comprising an upper cap 93 and a sub-stem 95 as disclosed hereinbefore;
c) securing a closure 20 of the pump assembly 50 to the bottle 40 to provide the pump dispenser 1;
d) triggering an actuator 10 of the pump assembly 50 which triggers by sequence a piston assembly 70 of the dual chamber pump 60, a connecting stem 84 and the sealing cap 90 of the dual chamber pump 60, such that when the actuator 10 is pushed down for a first time by a user, the piston assembly 70 moves to push down the connecting stem 84, which pushes down both the upper cap 93 and the sub-stem 95 of the sealing cap 90 to open the storage chamber 82 for releasing the substance S contained in the storage chamber 82;
e) shaking the bottle 40 to mix the substance S with the formulation F contained in the bottle 40 to form a final composition FC; and
f) triggering the actuator 10 to dispense the final composition FC from an actuator outlet 15.

The method of releasing a substance S in a formulation F contained in a bottle 40 of a pump dispenser 1 as disclosed hereinbefore may further specify that in step d), the upper cap 93 and the sub-stem 95 remain both engaged with the core 83 and do not fall in the bottle 40.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pump dispenser comprising:

a) a bottle comprising a neck;

b) a pump assembly comprising:

b1) an actuator;

b2) a closure connected to the actuator and coupled to the neck of the bottle;

b3) a dip tube;

b4) a dual chamber pump comprising:

i) a piston assembly, wherein the piston assembly is in fluid communication with the actuator;

wherein the piston assembly comprises a piston skirt; a piston rod engaged with the piston skirt; and a spring:

wherein the piston skirt seals the upper portion of the pump chamber;

wherein the piston rod has a hollow inner cavity having an upper portion and a lower portion;

wherein the upper portion of the hollow inner cavity includes a pull stick;

wherein the lower portion of the hollow inner cavity includes a piston tip;

ii) wherein the pull stick is engaged with the piston tip;

iii) wherein the piston tip is slidably engaged with the core and the piston tip is configured to move relative to the pull stick;

iv) a housing including a pump chamber, a storage chamber and a core:

wherein the pump chamber has a cavity therein, wherein the pump chamber has an upper portion and a lower portion, wherein the piston assembly is interior to the pump chamber and slidably engaged with the pump chamber;

wherein the storage chamber has a cavity therein, wherein the storage chamber has an upper portion and a lower portion, wherein the storage chamber cavity comprises a substance to be released in a formulation contained in the bottle;

wherein the core has a cavity therein; wherein the core is a sleeve protruding from the lower portion of the pump chamber through the storage chamber towards the dip tube;

wherein the core comprises a connecting stem;

iii) a sealing cap, wherein the sealing cap is rigidly connected to the core and closes the storage chamber at the lower portion of the storage chamber such that the substance to be released remains stored in the storage chamber cavity;

such that when the actuator is pushed down for a first time by a user, the piston assembly moves to push down the connecting stem, which pushes down the sealing cap to open the storage chamber for releasing the substance contained in the storage chamber in the bottle.

2. The pump dispenser according to claim 1, wherein the connecting stem and the sealing cap moves downwards at a distance along a longitudinal axis of the dual chamber pump from about 1 to about 10 mm.

3. The pump dispenser according to claim 1, wherein the sealing cap remains engaged with the core and do not fall in the bottle when the actuator is pushed down for the first time by the user.

4. The pump dispenser according to claim 1, wherein the sealing cap is a single piece, wherein the sealing cap is rigidly connected to the core at or adjacent to the lower portion of the storage chamber, wherein the dip tube is rigidly connected to the sealing cap, wherein the sealing cap wraps a portion of the core such that when the actuator is pushed down for a first time by the user, the piston assembly moves to push down the connecting stem, which pushes down the sealing cap to open the storage chamber for releasing the substance contained in the storage chamber in the bottle; and wherein the sealing cap remains engaged with the core and do not fall in the bottle.

5. The pump dispenser according to claim 1, wherein the sealing cap comprises an upper cap and a sub-stem, wherein the sub-stem is rigidly connected to the core at or adjacent to the lower portion of the storage chamber, wherein the dip tube is rigidly connected to the sub-stem, wherein the upper cap wraps a portion of the core and a portion of the sub-stem, such that when the actuator is pushed down for a first time by the user, the piston assembly moves to push down the connecting stem, which pushes down the upper cap and the sub-stem of the sealing cap both together to open the storage chamber for releasing the substance contained in the storage chamber in the bottle; and wherein the upper cap and the sub-stem remain both engaged with the core and do not fall in the bottle.

6. The pump dispenser according to claim 5, wherein the sub-stem wraps a portion of the connecting stem and a portion of the core.

7. The pump dispenser according to claim 1, wherein the storage chamber is located below the pump chamber.

8. The pump dispenser according to claim 1, wherein the storage chamber surrounds the pump chamber such that the pump chamber is interior to the storage chamber.

9. The pump dispenser according to claim 1, wherein the dual chamber pump includes an inlet one-way valve such that the inlet one-way valve permits fluid flow in a downstream direction from the bottle or the dip tube towards the pump chamber and the actuator to prevent fluid flow in an upstream direction.

10. The pump dispenser according to claim 1, wherein the spring at least partially surrounds the piston rod from a spring stop at the piston skirt, or adjacent and spaced to the piston skirt to a bottom of a spring seat at the lower portion of the pump chamber or adjacent and spaced to the lower portion of the pump chamber.

11. The pump dispenser according to claim 1, wherein the spring is located within the hollow inner cavity of the piston rod, wherein the spring at least partially surrounds the pull stick and the piston tip.

12. The pump dispenser according to claim 1, wherein the substance is selected from the group consisting of an amino acid surfactant, a perfume, a capsulated perfume, a perfume capsulated in b-cyclodextrin, an antimicrobial active, a probiotic material, a preservative material, a benefit phase, and mixtures thereof.

13. A pump assembly comprising:

an actuator;

a closure;

a dip tube;

a dual chamber pump comprising:

i) a piston assembly, wherein the piston assembly is in fluid communication with the actuator;

wherein the piston assembly comprises a piston skirt; a piston rod engaged with the piston skirt; and a spring:

wherein the piston skirt seals the upper portion of the pump chamber;

wherein the piston rod has a hollow inner cavity having an upper portion and a lower portion;

wherein the upper portion of the hollow inner cavity includes a pull stick;

wherein the lower portion of the hollow inner cavity includes a piston tip;

ii) a housing including a pump chamber, a storage chamber and a core:

wherein the pump chamber has a cavity therein, wherein the pump chamber has an upper portion and a lower portion, wherein the piston assembly is interior to the pump chamber and slidably engaged with the pump chamber;

wherein the storage chamber has a cavity therein, wherein the storage chamber has an upper portion and a lower portion, wherein the storage chamber cavity comprises a substance to be released in a formulation contained in the bottle;

wherein the core has a cavity therein; wherein the core is a sleeve protruding from the lower portion of the pump chamber through the storage chamber towards the dip tube;

wherein the core comprises a connecting stem;

iii) a sealing cap, wherein the sealing cap is rigidly connected to the core and closes the storage chamber at the lower portion of the storage chamber such that the substance to be released remains stored in the storage chamber cavity;

such that when the actuator is pushed down for a first time by a user, the piston assembly moves to push down the connecting stem, which pushes down the sealing cap to open the storage chamber for releasing the substance contained in the storage chamber.

14. A method of releasing a substance in a formulation contained in a bottle of a pump dispenser according to claim 1 comprising the following steps, preferably in that order:

a) filling a substance to be released in a storage chamber of a dual chamber pump of a pump assembly;

b) closing the storage chamber with a sealing cap;

c) securing the closure of the pump assembly to the bottle to provide the pump dispenser;

d) triggering an actuator which triggers by sequence a piston assembly of the dual chamber pump, the connecting stem and the sealing cap of the dual chamber pump, such that when the actuator is pushed down for a first time by a user, the piston assembly moves to push down the connecting stem, which pushes down the sealing cap to open the storage chamber for releasing the substance contained in the storage chamber;

e) shaking the bottle to mix the substance with the formulation contained in the bottle to form a final composition; and f) triggering the actuator to dispense the final composition from an actuator outlet.

* * * * *